US012580343B2

(12) United States Patent
Maddens

(10) Patent No.: US 12,580,343 B2
(45) Date of Patent: Mar. 17, 2026

(54) HIGH SPEED, RUGGEDIZED CONNECTOR

(71) Applicant: FCI USA LLC, Etters, PA (US)

(72) Inventor: Koen Maddens, Hofstade (BE)

(73) Assignee: FCI USA LLC, Etters, PA (US)

( * ) Notice: Subject to any disclaimer, the term of this patent is extended or adjusted under 35 U.S.C. 154(b) by 667 days.

(21) Appl. No.: 17/900,563

(22) Filed: Aug. 31, 2022

(65) Prior Publication Data

US 2023/0062139 A1 Mar. 2, 2023

Related U.S. Application Data

(60) Provisional application No. 63/239,937, filed on Sep. 1, 2021.

(51) Int. Cl.
*H01R 13/533* (2006.01)
*H01R 13/627* (2006.01)
(Continued)

(52) U.S. Cl.
CPC ....... *H01R 13/533* (2013.01); *H01R 13/6272* (2013.01); *H01R 13/6581* (2013.01);
(Continued)

(58) Field of Classification Search
CPC .............. H01R 13/533; H01R 13/6272; H01R 13/6585; H01R 13/6591; H01R 13/6592;
(Continued)

(56) References Cited

U.S. PATENT DOCUMENTS 6,488,520 B1 12/2002 Hayes et al.
6,537,098 B2 3/2003 Kashiyama et al.
(Continued)

FOREIGN PATENT DOCUMENTS

CN 105591255 A 5/2016
CN 107017528 A 8/2017
(Continued)

OTHER PUBLICATIONS

Embossment Definition, Jun. 27, 2025 [retrieved Jun. 27, 2025]. Retrieved from the Internet: <https://www.merriam-webster.com/dictionary/embossment>.*

(Continued)

*Primary Examiner* — Renee S Luebke
*Assistant Examiner* — Paul D Baillargeon
(74) *Attorney, Agent, or Firm* — Wolf, Greenfield & Sacks, P.C.

(57) ABSTRACT

A modular connector system with components that can be economically assembled to provide high signal integrity in a harsh environment, such as an automobile. In some connectors, electrical conductors serving as signal conductors may be at least partially encircled by a conductive sheet formed into a tube. The tube may be formed by joining opposite edges of the sheet with tab portions extending from the edges. The tab portions may be bent to extend radially outwards from the cavity and crimped together, providing mechanical integrity to the shield, as well as a tab that polarizes the shield to block incorrect insertion into an insulative housing and can engage with components in the insulative housing to latch the shield in the housing. Other disclosed techniques economically and stably position electrical conductors, which may serve as signal terminals relative to ground structures, electrically and mechanically connect shields, or compensate for impedance variations.

30 Claims, 34 Drawing Sheets

(51) Int. Cl.
*H01R 13/6581* (2011.01)
*H01R 13/6591* (2011.01)

(52) U.S. Cl.
CPC .. *H01R 13/65912* (2020.08); *H01R 13/65915* (2020.08); *H01R 2201/26* (2013.01)

(58) Field of Classification Search
CPC ....................... H01R 13/6582; H01R 2201/26; H01R 24/22; H01R 13/658; H01R 13/6581; H01R 13/4361
USPC ........................... 439/607.23, 607.27, 607.45
See application file for complete search history.

(56) References Cited

U.S. PATENT DOCUMENTS 6,705,886 B1 3/2004 Brown
6,780,045 B2 8/2004 Shuey et al.
6,811,424 B2 11/2004 Seminara et al.
6,926,557 B1 8/2005 Yamaguchi et al.
6,951,483 B2 * 10/2005 Kameyama .......... H01R 9/0518 439/99
7,033,193 B2 4/2006 Higgins et al.
7,094,099 B2 8/2006 Daggett et al.
7,195,505 B1 3/2007 Becker
7,318,742 B2 * 1/2008 Morikawa ............ H01R 9/0518 174/75 C
7,753,713 B2 7/2010 Neale, III
7,811,115 B1 10/2010 Tyler
7,866,992 B2 1/2011 Pfeiffer
7,918,677 B2 4/2011 Robert
8,079,855 B2 12/2011 Pfeiffer
8,083,533 B2 12/2011 De Chazal
8,147,272 B2 4/2012 Rhein
8,267,710 B2 9/2012 Pfeiffer
8,579,647 B2 11/2013 Phillips et al.
8,777,665 B2 7/2014 Il
8,888,521 B2 11/2014 Puckett et al.
8,905,777 B2 12/2014 Zhu et al.
8,905,787 B2 12/2014 Blakborn et al.
8,939,786 B2 1/2015 Rosenberger et al.
9,070,998 B2 6/2015 Phillips et al.
9,142,907 B2 9/2015 Jones et al.
9,350,116 B1 5/2016 Morello et al.
9,362,656 B2 6/2016 Singhammer et al.
9,362,659 B2 6/2016 Jones et al.
9,362,676 B2 6/2016 Puhl et al.
9,640,883 B2 5/2017 Tatzel et al.
9,722,348 B2 8/2017 Zebhauser et al.
9,917,381 B1 3/2018 Campbell et al.
9,960,504 B2 * 5/2018 Hikosaka ................. H01R 4/18
9,960,515 B2 5/2018 Uenosono et al.
10,103,500 B2 10/2018 Zebhauser et al.
10,141,688 B2 11/2018 Wimmer et al.
10,181,678 B2 1/2019 Pemwieser
10,211,568 B2 2/2019 Blakborn et al.
10,224,659 B2 3/2019 Pemwieser et al.
10,297,932 B2 * 5/2019 Maesoba ............ H01R 13/6477
10,305,219 B2 5/2019 Zebhauser et al.
10,305,222 B2 5/2019 Haller
10,348,044 B2 7/2019 Surer
10,389,066 B2 8/2019 Armbrecht et al.
10,446,951 B2 10/2019 Miedl
10,490,937 B1 11/2019 Su et al.
10,541,488 B2 1/2020 Zebhauser et al.
10,553,977 B2 2/2020 Pemwieser et al.
10,608,388 B2 3/2020 Hasenöhrl et al.
10,637,180 B1 4/2020 He et al.
10,700,480 B2 6/2020 Annequin
10,741,937 B2 8/2020 Miedl
10,749,295 B2 8/2020 Mayer et al.
10,784,615 B2 9/2020 Bredbeck
10,826,216 B2 11/2020 Zebhauser et al.
10,886,668 B1 1/2021 Morello et al.
10,886,720 B2 1/2021 Pichlmaier et al.
10,903,610 B1 1/2021 He et al.
10,910,747 B1 2/2021 He et al.
10,944,218 B2 3/2021 Lödding
10,950,979 B2 3/2021 Lödding et al.
11,114,799 B2 9/2021 Schoedel et al.
11,146,010 B2 10/2021 Evans
11,245,228 B2 2/2022 Takeuchi et al.
11,283,223 B2 3/2022 Zebhauser et al.
11,362,466 B2 6/2022 Droesbeke et al.
11,387,604 B2 7/2022 Margrave et al.
11,503,730 B2 11/2022 Yi et al.
11,539,168 B2 12/2022 Shiga
11,545,777 B2 1/2023 Sundarakrishnamachari et al.
11,621,513 B2 4/2023 He et al.
2003/0129864 A1 7/2003 Peloza
2006/0089046 A1 4/2006 Annequin
2009/0275226 A1 11/2009 Chen
2010/0068911 A1 3/2010 Nagano et al.
2011/0092095 A1 4/2011 Annequin
2011/0143567 A1 6/2011 Purdy et al.
2013/0052866 A1 2/2013 II
2013/0341906 A1 12/2013 Lehmann et al.
2015/0266129 A1 9/2015 Ihde et al.
2015/0288090 A1 10/2015 Shigeta et al.
2015/0303606 A1 10/2015 Singhammer et al.
2016/0093984 A1 3/2016 Iwamoto
2016/0104971 A1 4/2016 Kurachi
2016/0164232 A1 6/2016 Lane et al.
2017/0214168 A1 7/2017 Schroll et al.
2017/0271815 A1 9/2017 Lane et al.
2018/0261954 A1 9/2018 Zebhauser et al.
2018/0366856 A1 12/2018 Pemwieser et al.
2019/0157809 A1 5/2019 Maesoba et al.
2019/0237898 A1 8/2019 Naganuma
2019/0267727 A1 8/2019 Zebhauser et al.
2019/0288464 A1 9/2019 Annequin et al.
2020/0076179 A1 3/2020 Pichlmaier et al.
2020/0153148 A1 5/2020 Annequin et al.
2020/0203894 A1 6/2020 Zebhauser et al.
2020/0227873 A1 7/2020 Hasenöhrl et al.
2021/0021074 A1 1/2021 Fuchs et al.
2021/0057853 A1 2/2021 Droesbeke et al.
2021/0057854 A1 2/2021 Droesbeke
2021/0057855 A1 2/2021 Droesbeke et al.
2021/0242627 A1 8/2021 Pemwieser et al.
2021/0257786 A1 * 8/2021 Evans ................ H01R 13/6581
2021/0367385 A1 11/2021 Anfang
2021/0408702 A1 12/2021 Blakborn
2021/0408730 A1 12/2021 Blakborn
2022/0263263 A1 8/2022 Shiga
2022/0263270 A1 8/2022 Shiga
2022/0329008 A1 10/2022 Hohenadl
2022/0360009 A1 11/2022 Pavlovic et al.
2022/0360027 A1 11/2022 Bredbeck et al.
2023/0033981 A1 * 2/2023 Matsuda ............ H01R 13/6473
2023/0231341 A1 7/2023 Hofmann et al.
2023/0238740 A1 7/2023 Rouillard et al.
2023/0253735 A1 8/2023 Sundarakrishnamachari et al.
2024/0072482 A1 2/2024 He et al.
2024/0305047 A1 9/2024 He et al.
2024/0313458 A1 9/2024 He et al.
2025/0266637 A1 8/2025 Maddens et al.

FOREIGN PATENT DOCUMENTS

CN 108475884 A 8/2018
CN 209169506 U 7/2019
CN 209233075 U 8/2019
CN 210430259 U 4/2020
CN 210668849 U 6/2020
CN 111418117 A 7/2020
CN 111682372 A 9/2020
CN 111682373 A 9/2020
CN 111883962 A 11/2020
CN 112490735 A 3/2021
CN 112956085 A 6/2021
CN 113036499 A 6/2021
CN 113555740 A 10/2021
CN 214542638 U 10/2021

(56) References Cited

FOREIGN PATENT DOCUMENTS

| | | | |
|---|---|---|---|
| CN | 214542783 | U | 10/2021 |
| CN | 111919348 | B | 1/2022 |
| CN | 111226358 | B | 2/2022 |
| CN | 216121010 | U | 3/2022 |
| CN | 217691946 | U | 10/2022 |
| CN | 112753136 | B | 6/2023 |
| CN | 116565610 | A | 8/2023 |
| DE | 602004002804 | T2 | 8/2007 |
| DE | 202013000969 | U1 | 5/2014 |
| DE | 102006029075 | B4 | 12/2016 |
| DE | 102016109266 | A1 | 11/2017 |
| DE | 102017006767 | A1 | 1/2019 |
| DE | 102017123080 | A1 | 4/2019 |
| DE | 102018104253 | A1 | 8/2019 |
| DE | 102019104754 | A1 | 9/2019 |
| DE | 102018113365 | A1 | 12/2019 |
| DE | 102018113368 | A1 | 12/2019 |
| DE | 102018126448 | A1 | 4/2020 |
| DE | 102018127578 | A1 | 5/2020 |
| DE | 102018127969 | A1 | 5/2020 |
| EP | 2273619 | A1 | 1/2011 |
| EP | 2504890 | A1 | 10/2012 |
| EP | 2586105 | A1 | 5/2013 |
| EP | 2805381 | A1 | 11/2014 |
| EP | 3096410 | A1 | 11/2016 |
| EP | 2340588 | B1 | 4/2017 |
| EP | 3251173 | A1 | 12/2017 |
| EP | 3262722 | A1 | 1/2018 |
| EP | 3282521 | A2 | 2/2018 |
| EP | 3332451 | A1 | 6/2018 |
| EP | 3387710 | A1 | 10/2018 |
| EP | 3396791 | A1 | 10/2018 |
| EP | 3472902 | A1 | 4/2019 |
| EP | 2876744 | B1 | 9/2019 |
| EP | 3537549 | A1 | 9/2019 |
| EP | 3540865 | A1 | 9/2019 |
| EP | 3553894 | A1 | 10/2019 |
| EP | 3573187 | A1 | 11/2019 |
| EP | 3618197 | A1 | 3/2020 |
| EP | 3660986 | A1 | 6/2020 |
| EP | 3703196 | A1 | 9/2020 |
| EP | 3713018 | A1 | 9/2020 |
| EP | 3719933 | A1 | 10/2020 |
| EP | 3783755 | A1 | 2/2021 |
| EP | 3837741 | A1 | 6/2021 |
| EP | 3907830 | A1 | 11/2021 |
| EP | 3916931 | A1 | 12/2021 |
| EP | 3769378 | B1 | 3/2023 |
| GB | 2599908 | B | 1/2023 |
| JP | 2006-507649 | A | 3/2006 |
| JP | 2014-225371 | A | 12/2014 |
| JP | 2018-060666 | A | 4/2018 |
| JP | 6933941 | B2 | 9/2021 |
| JP | 6981844 | B2 | 12/2021 |
| JP | 7237979 | B2 | 3/2023 |
| KR | 20120024437 | A | 3/2012 |
| TW | M621315 | U | 12/2021 |
| WO | WO 2009/064484 | A1 | 5/2009 |
| WO | WO 2017/144071 | A1 | 8/2017 |
| WO | WO 2022/002611 | A1 | 1/2022 |
| WO | WO 2022/175334 | A1 | 8/2022 |
| WO | WO 2022/243083 | A1 | 11/2022 |

OTHER PUBLICATIONS

Relief Definition, Jun. 27, 2025 [retrieved Jun. 27, 2025]. Retrieved from the Internet: <https://www.google.com/search?q=relief+definition>.*

He et al., High Speed, Ruggedized Connector, U.S. Appl. No. 18/169,962, filed Feb. 16, 2023.

International Search Report and Written Opinion mailed Dec. 26, 2022 in connection with International Application No. PCT/US2022/042176.

[No Author Listed], Ethernet—USCAR. 2022. 1 page. URL:https://uscar.org/ewcapbak/ethernet-2/#279-281-wpfd-ethernet-unsealed [last accessed on Dec. 5, 2022].

Maddens et al., High Speed, Ruggedized Connector. Co-pending U.S. Appl. No. 19/066,841, filed Feb. 28, 2025.

Maddens et al., High Speed, Ruggedized Compact Cable Connector. Co-pending U.S. Appl. No. 19/119,391, filed Apr. 8, 2025.

Maddens et al., High Speed, Ruggedized Connector. Co-pending U.S. Appl. No. 19/119,392, filed Apr. 8, 2025.

Extended European Search Report dated Sep. 17, 2025 in connection with European Application No. 22865492.7.

* cited by examiner

HIGH SPEED, RUGGEDIZED CONNECTOR

CROSS-REFERENCE TO RELATED APPLICATIONS

This application claims priority to and the benefit of U.S. Provisional Application Ser. No. 63/239,937, filed on Sep. 1, 2021, entitled "HIGH SPEED, RUGGEDIZED CONNECTOR," the contents of which are incorporated herein by reference in their entirety.

BACKGROUND

This patent application relates generally to interconnection systems, such as those including electrical connectors, used to interconnect electronic assemblies, and more specifically to interconnection systems for harsh environments, such as in a vehicle.

Electrical connectors are used in many electronic systems. It is generally easier and more cost effective to manufacture a system as separate electronic assemblies, which may be joined together with electrical connectors. Connectors may be used for interconnecting assemblies so that the assemblies may operate together as part of a system. Connectors, for example, may be mounted on printed circuit boards withing two assemblies that are connected by mating the connectors. In other systems, it may be impractical to join two printed circuit boards by directly mating connectors on those printed circuit boards. For example, when the system is assembled, those printed circuit boards may be separated by too great a distance for a direct connection between connectors mounted in the printed circuit boards.

In some systems, connections between assemblies may be made through cables. The cables may be terminated with connectors that mate with connectors mounted on a printed circuit board. In this way, connections between assemblies may be made by plugging a connector that is part of cable assembly into a connector that is mounted to printed circuit board. In other system architectures, a connector terminating a cable may be mated with another connector terminating another cable.

An example of a system in which assemblies are connected through cables is a modern automobile. For example, automotive vehicles include electronic control units (ECUs) for controlling various vehicle systems, such as the engine, transmission (TCUs), security systems, emissions control system, lighting, advanced driver assistance systems (ADAS), entertainment systems, navigation systems, and cameras. These control units may be manufactured as separate assemblies and connected over one or more vehicle networks formed with cables routed between these assemblies. To simplify manufacture of an automobile, the assemblies may be formed separately and then connected via cables that are terminated with connectors that enable connections to mating connectors terminating other cables or attached to printed circuit boards within the assemblies.

An automobile presents a harsh environment for an electrical connector. The automobile may vibrate, which can cause a connector to unmate and cease working entirely. Even if the vibration does not completely prevent operation of the connector, it can cause electrical noise, which can interfere with operation of electronics joined through interconnects including connectors. Noise, for example, may result from relative movement of components within connectors, which can change the electrical properties of the connector. Variations in the electrical properties, in turn, cause variation in the signals passing through the interconnect, which is a form of noise that interferes with processing the underlying signal.

In an automotive environment, electrical noise might also arise from automotive components that generate electromagnetic radiation. That radiation can couple to the conductive structures of a connector, creating noise on any signals passing over those conductive structures. In an automobile, any of a number of components might generate electromagnetic radiation, such as spark plugs, alternators or power switches. Noise can be particularly disruptive for high speed signals such as those use to communicate data over an automobile network.

SUMMARY

Concepts as disclosed herein may be embodied as an electrical connector, comprising at least one electrical conductor and a shield comprising a sheet with a first edge and a second edge. The first edge may be joined to the second edge to at least partially encircle a cavity with a perimeter bounded by the sheet. At least a part of the at least one electrical conductor may be disposed within the cavity, and the sheet may comprise a tab extending away from the cavity in a direction orthogonal to the perimeter.

Such an electrical connector may include one or more of the following features:

The tab may comprise a latching feature.

The first edge may be joined to the second edge via interlocking projections and openings at the first edge and the second edge.

The tab may extend from the first edge of the sheet.

The tab may comprise a first tab portion extending from the sheet and a second tab portion extending portion; and the first tab portion may be parallel to and adjacent to the second tab portion. Optionally, the first tab portion extends from the sheet at the first edge, and the second tab portion extends from the sheet at the second edge.

The electrical connector may comprise a mating end; the cavity may be open at the mating end of the connector; the tab may have a first edge facing the mating end and a second edge opposite the first edge; the first edge of the tab is tapered towards the mating end of the connector; and the second edge of the tab may be orthogonal to the perimeter The electrical connector may further comprise an insulative housing comprising an opening. The insulative housing may comprise a beam comprising a cantilevered end and a latch at the cantilevered end extending into the opening. The shield is inserted into the opening, and the beam is configured such that the latch is aligned with the second edge of the tab when the shield is fully inserted into the cavity. Optionally, the latch may comprise a camming surface, and the beam may be configured such that the first edge of the tab is aligned with the camming surface of the latch when the shield is partially inserted into the cavity The at least one electrical conductor may comprise a pair of signal terminals. Optionally, shield may comprise a first shield, and the tab may comprise a first tab. The electrical connector may comprise a second shield at least partially encircling the cavity, and the second shield may comprise a second tab extending away from the cavity in a direction orthogonal to the perimeter. The electrical connector may further comprise a position assurance device comprising a member extending into the cavity and engaging the second tab.

The first shield may have an axis of elongation; the first shield is concentric with and electrically connected to the second shield; and the first tab is aligned with the second tab in a direction of the axis of elongation.

In another aspect, concepts as disclosed herein may be embodied as an electrical connector, comprising a mating end and a cable termination end, opposite the mating end. The electrical connector may comprise at least one electrical conductor; a first shield comprising a first sheet, wherein the first sheet encircles a first portion of a cavity; and a second shield comprising a second sheet. The second sheet may encircle a second portion of the cavity, the second portion of the cavity overlapping the first portion of the cavity in a region of overlap. At least a part of the at least one electrical conductor may be disposed within the cavity. In the region of overlap, the second shield is inside the first shield and the second shield comprises an outwardly extending embossment.

Such an electrical connector may include one or more of the following features:

The embossment may electrically connect the first shield and the second shield.

The second shield may comprise an axis of elongation and a perimeter, and the embossment may comprise a ridge extending around at least 40% of the perimeter. Optionally, the second shield may have an oval cross section in the region of overlap comprising first and second curved segments joined by first and second linear segments, and the embossment may comprise first and second ridges extending from the first and second curved segments, respectively.

Alternatively or additionally, the first shield may comprise a beam; the second shield may comprise a slot, and a distal portion of the beam may extend through the slot such that the first shield is mechanically connected to the second shield.

Alternatively or additionally, the beam may be cut in the first sheet; and the slot of the second shield is disposed in the first linear segment of the second shield.

Alternatively or additionally, the beam may comprise a first segment parallel to the first sheet and a second segment transverse to the first segment, the second segment extends through the opening.

Alternatively or additionally, the beam may be a first beam; the first shield may comprise a second beam; the slot may be a first slot; the second shield may comprise a slot, parallel to the first slot; and a distal end of the second beam may extend through the second slot.

In another aspect, an electrical connector may be terminated to a cable comprising a cable shield. An end of the cable with the cable shield exposed may be inserted in the cavity; the second shield may encircle the cable inserted in the cavity and electrically connect to the exposed cable shield; the first shield may comprise contact beams configured for mating with a ground structure of a complementary connector; and the contact beams of the first shield may be electrically coupled through the first shield, the embossment and the second shield to the cable shield.

Alternatively or additionally, the first shield may comprise at least one beam; the second shield may comprise at least one slot, a distal portion of each beam of the at least one beam may extend through a respective slot of the at least one slot; and the mechanical attachment of the first shield to the second shield may consist essentially of engagement of the at least one beam and the at least one slot and friction between the embossment and the first shield.

In another aspect, concepts as disclosed herein may be embodied as a cable assembly comprising a cable terminated with an electrical connector. The electrical connector may comprise a connector shield at least partially encircling a first portion of a cavity; and a metal member within the cavity, the metal member comprising an opening therethrough. The cable may comprise a first portion outside the cavity comprising: a first insulated electrical conductor; a second insulated electrical conductor; and a cable shield at least partially surrounding the first and second insulated electrical conductors, with the first and second insulated conductors separated with a first center-to-center spacing. The cable may comprise a second portion disposed within the cavity, the second portion comprising the first insulated electrical conductor and the second insulated electrical conductor, with the first and second insulated conductors separated with a second center-to-center spacing. The second portion of the cable may pass through the opening of the metal member.

Such a cable assembly may include one or more of the following features:

The second center-to-center spacing may be larger than the first center-to-center spacing; and the metal member may be configured to match the impedance of the second portion of the cable to the first portion of the cable.

The cable shield may be absent in the second portion.

Alternatively or additionally, the connector shield is electrically connected to the cable shield.

Alternatively or additionally, in the connector may further comprise a ferrule comprising a first annular portion, a second annular portion, and a plurality of arms joining the first annular portion to the second annular portion. The cable may pass through the first annular portion and the second annular portion, and the second annular portion may be between the first annular portion and the metal member.

Alternatively or additionally, the first annular portion may contact the cable shield.

Alternatively or additionally, the connector shield may be crimped around the first annular portion; and the connector may further comprise first and second contacts crimped to respective conductors of the first and second insulated conductors.

Alternatively or additionally, the metal member may be an impedance adaptor.

Alternatively or additionally, the ferrule may comprise a first metal sheet formed into a tube; the impedance adapter comprises a second metal sheet formed into a tube; and the first metal sheet and the second metal sheet are of a same material and have a same thickness.

The metal member may comprise a first end and a second end with the opening extending between the first end and the second end; the opening at the first end may be shaped as an oval; the opening, at the second end may be shaped as an oval with a major axis and embossments extending towards the major axis; and the embossments may be between the first and second insulated electrical conductors.

In another aspect, concepts as disclosed herein may be embodied as an electrical connector, comprising a conductive housing comprising a chamber; a shield member within and electrically and mechanically engaged to the conductive housing; a terminal assembly disposed within the chamber, the terminal assembly comprising an insulative member and an electrical conductor held by the insulative member. The insulative member may comprise a spacer separating at least a portion of the electrical conductor and the shield member.

Such an electrical connector may include one or more of the following features:

The insulative member may comprise a body and the spacer comprises a rib extending from the body.

The electrical conductor may comprise a terminal comprising a mating contact portion and a contact tail and an intermediate portion joining the mating contact portion and the contact tail; the mating contact portion and the contact tail may extend in perpendicular directions; and the spacer may separate the shield member and a portion of the electrical conductor parallel to the contact tail.

Alternatively or additionally, an impedance of a first portion of the electrical conductor parallel to the contact tail may match an impedance of a second portion of the electrical conductor parallel to the mating contact portion.

Alternatively or additionally, the second portion of the electrical conductor may be disposed within the chamber of the conductive housing; and the first portion of the electrical conductor is separated from the shield member by the spacer.

The electrical connector may be a right angle connector comprising a mating interface and a mounting interface at a right angle to the mating interface; and the shield member may be perpendicular to the mounting interface.

The chamber may be a first chamber, and the conductive housing may comprise a plurality of chambers, including the first chamber, disposed in a row extending in a row direction. The shield member may be a first shield member, and the electrical connector may comprise a plurality of shield members within and electrically and mechanically engaged to the conductive housing, the plurality of shield members may include the first shield member. Each of the plurality of shield members may comprise a planar portion extending in a direction parallel to the row direction. The terminal assembly may be a first terminal assembly, and the electrical connector may comprise a plurality of terminal assemblies, including the first terminal assembly. Each of the plurality of terminal assemblies may be disposed in a respective chamber of the plurality of chambers; and each of the plurality of terminal assemblies may comprise a spacer adjacent the planar portion of a respective shield member of the plurality of shield members.

Alternatively or additionally, the row may be a first row. The plurality of chambers may be a first plurality of chambers. The conductive housing may comprise a second plurality of chambers disposed in a second row extending in the row direction; and the electrical connector may comprise a second plurality of shield members within and electrically and mechanically engaged to the conductive housing. The electrical connector may comprise a second plurality of terminal assemblies, each of the second plurality of terminal assemblies disposed in a respective chamber of the second plurality of chambers. Each of the second plurality of terminal assemblies may comprise a spacer adjacent a shield member of the second plurality of shield members.

Alternatively or additionally, each terminal assembly of the first plurality of terminal assemblies and the second plurality of terminal assemblies may comprise one pair of electrical conductors, each electrical conductor of the pair being positioned the same distance from an adjacent shield member by the spacer of the terminal assembly.

The electrical connector may be a board connector comprising a mounting interface configured for mounting to a printed circuity board. The conductive housing may comprise inward facing surfaces, and at least two of the inward facing surfaces may comprise grooves. The shield may comprise edges disposed within the grooves of the inward facing surfaces such that the shield is held perpendicular to the mounting interface.

In another aspect, concepts as disclosed herein may be embodied as an electrical connector, comprising: a conductive housing comprising a chamber and a terminal assembly disposed within the chamber. The terminal assembly may comprise an insulative member with a channel therethrough and an electrical conductor comprising a mating contact portion and a tail and an intermediate segment joining the mating contact portion and the tail. The contact portion and the tail may extend from the insulative member. The intermediate segment may be disposed within the channel, may have has a first width for over 50% of its length within the channel, may comprise a barb, with a second width wider than the first width, engaging the insulative member, and may comprise a conductor portion, proximate the barb with a third width, narrower than the first width.

Such an electrical connector may include one or more of the following features:

The conductor portion may comprise an impedance compensation portion.

The channel may have a first channel portion with a first channel width; the channel may have a second channel portion with a second channel width, narrower than the first channel width; portions of the intermediate segment of the electrical conductor with the first width may be disposed in the first channel portion; and the conductor portion may be disposed within the second channel portion.

Alternatively or additionally, the channel may be a first channel and the insulative member comprises a second channel parallel to the first channel; and the electrical conductor is a first electrical conductor, and the terminal assembly comprises second electrical conductor disposed within the second channel.

Alternatively or additionally, the first electrical conductor and the second electrical conductor may be configured as a differential pair.

Alternatively or additionally, the first electrical conductor and the second electrical conductor may have the same shape; and the first channel and the second channel may have the same shape.

Alternatively or additionally, the electrical connector may be a right angle connector and the mating contact portions and tails of the first electrical conductor and the second electrical conductor may extend from the first channel and second channel, respectively, in orthogonal directions.

BRIEF DESCRIPTION OF DRAWINGS

The accompanying drawings are not limited to the dimensions shown. For purposes of clarity, not every component may be labeled in every drawing. In the drawings.

DETAILED DESCRIPTION

Figure 1:
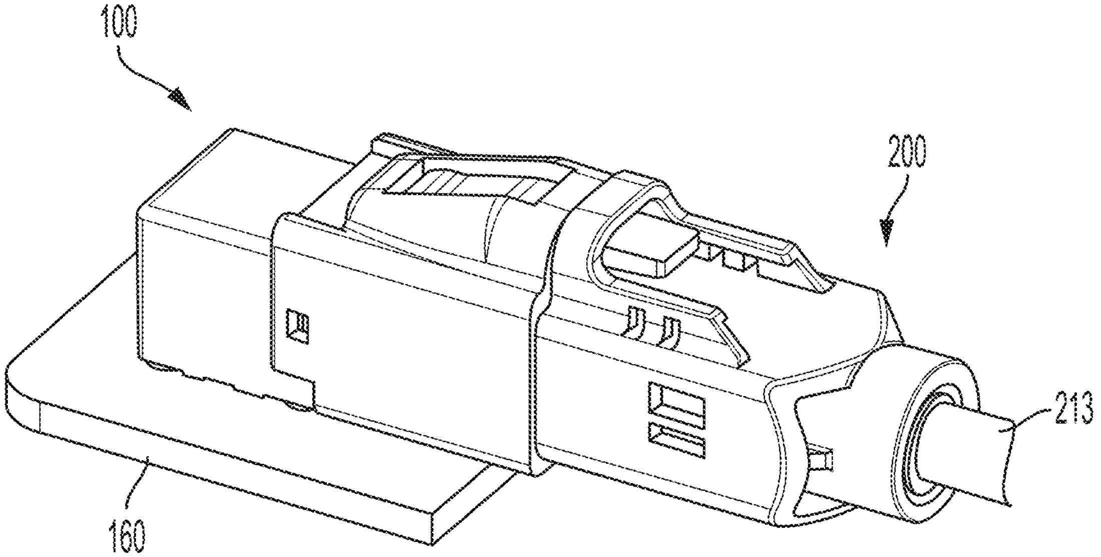
FIG. 1 is a perspective view of an illustrative interconnection system, in accordance with some embodiments.

The inventors have recognized and appreciated techniques for making a connector for providing high data rate transmission that may be economically manufactured yet operates reliably in the harsh environment presented by an automobile. Such a connector would be suitable for interconnecting assemblies in an automotive network, for example. These techniques may be applied in a modular connector system in which a set of components may be combined to form connectors in any of multiple configurations. This modularity reduces costs associated with manufacturing connectors of the types described herein.

Each connector configuration may be formed with an insulative outer housing that establishes at least a mating interface of the connector. The outer housing may be insulative and may also provide latching features. The set of components may include insulative outer housings in complementary configurations, which may be used to form two connector configurations that will mate and latch to each other.

A conductive structure at least partially encircling a cavity may be positioned within the outer housing. The cavity may be open at a mating end extending into the mating interface. The set of components may include conductive structures in one or more configurations that mate to each other. A conductive structure, for example, may be die cast with a cavity or may be one or more sheets of metal formed into a tube. A tube, forming one conductive structure of the set, may be sized to fit within an opening into a cavity of another conductive structure such that the conductive structures can mate. Alternatively, the set may include tubes of one radius sized to fit within tubes of a larger radius. In some embodiments, multiple conductive structures may be incorporated into the same insulative outer housing to configure connectors of different sizes. Alternatively or additionally, die cast conductive structures may be formed with different numbers of cavities. By providing a variable number of cavities within a mating interface, some connectors may be configured with a 1×1 mating interface and other connectors may be configured with mating interfaces of other sizes, such as a 2×2 mating interface or a 2×3 mating interface, for example.

Regardless of the number of cavities integrated within the housing, a terminal assembly may be inserted into the cavity. Each terminal assembly may have an insulative member, serving as a terminal carrier, that receives one or more electrical conductors, each of which may serve as a terminal of the connector. The set of connector components may include at least two styles of terminals configured to mate to one another, such as pin and receptacle style terminals. Terminals may also have different style tails, with tails configured to be attached to a printed circuit board or to be attached to a conductor of a cable.

The different mating and mounting configurations may be used in combination to form board connectors or cable connectors with mating interfaces that allow intermating of the connectors. A board connector may mate with a cable connector, or two cable connectors may mate, for example.

In some embodiments, each terminal carrier may be configured to carry one signal, whether as a single ended signal or as a differential signal. In the exemplary embodiments illustrated below, each terminal carrier has a pair of electrical conductors suitable for carrying a differential signal. The conductive structure bounding the cavity into which the terminal carrier is inserted, may serve as a shield for the signal carried by the terminal carrier. The mating interfaces may be such that the terminals of mating connectors mate, both mechanically and electrically, as do the conductive structures forming shields around those terminals.

The inventors have recognized and appreciated various techniques that may be applied to the components of the connector system to provide connections with high signal integrity (SI). SI improvements may result from controlling the electrical properties of the signal paths through the connector and/or from configuring the connector to operate effectively, notwithstanding the rugged automotive environment in which the connector is used.

For example, in embodiments in which the shield includes a tube formed from one or more metal sheets, a sheet may be stamped with a tab extending from an edge of the sheet. When the sheet is formed into a sheet and joined at the edges, the tab may be bent in a direction away from the cavity enclosed by the shield.

The tab may serve as a latch feature, which may aid in holding the shield in an insulative housing. One or more such tabs may be provided along a tubular shield. In some embodiments, a latch feature may form a stop for contact against a housing of the connector. Furthermore, the latch features of the shield and corresponding recesses in a housing of the connector may be used as a polarizing feature for ensuring proper orientation of the shield with respect to the outer insulative housing. For example, the latch features may be provided on one side of the shield with a corresponding recess on one side of the housing, ensuring that the shield may be inserted into the housing in only a desired orientation.

In some embodiments, tab portions may extend from two edges of a metal sheet that abut when the sheet is formed into a tube. The tab portions may both be bent to be parallel and adjacent one another. In this position, they may be crimped to form a tab and to provide mechanical integrity to the resulting tube, which in turn increases signal integrity by reducing variations in the relative position of the shield and conductors in the cavity formed by the shield. Thus, a simply formed tab may provide multiple functions in some embodiments. Moreover, securing edges of a sheet through the use of tab portions that extend from edges of the sheet allows secure joining of opposing sides of the sheet without cutting large openings in the portions of sheet encircling the cavity. As openings in the portion of the sheet intended to shield the cavity would reduce shielding effectiveness, joining ends of the sheet via a tab contributes to high signal integrity.

As an example of another technique, a tubular shield may be formed as a first shield and a second shield that are reliably yet economically electrically and mechanically connected. The first shield, for example, may be a front shield, for example, and may include the mating interface. The second shield may be a back shield and may be configured to be attached to a cable. A portion of the second shield may fit within a portion of the first shield, or vice versa. One of the shields may include an embossment in the region of overlap. The embossment may provide contact, friction and/or electrical connectivity between the shields. Mechanical coupling between the first shield and the second shield may be provided by one or more beams, cut into one of the shields, that have cantilevered ends bent to fit into slots in the other shield.

A further technique may be applied in a connector terminating a cable as part of a cable assembly. In such a connector, an end of a cable may be inserted into a cavity at least partially encircled by a shield. The end of the cable may be prepared to be attached to the cable connector in ways that change the electrical properties of the cable in that portion compared to the bulk of the cable. For example, the cable shield may be removed, and, for a twinax cable, the conductors of the cable may be separated to enable terminals to be attached the conductor. This manipulation of the cable structure may change the impedance of this portion of the cable, which may degrade signal integrity. A separate metal member may be placed over this portion of the cable and electrically coupled to the shield. The metal member reduces the spacing between the conductors of the cable and the shield, which may be connected to ground. As a result of this change in signal to ground spacing, the impedance in the termination portion of the cable may better match the impedance in the bulk cable. In this way, the separate metal member may serve as an impedance adapter. The impedance adapter may avoid the need for complex manufacturing operations required to shape the shield to provide a signal to ground spacing for impedance matching.

In some embodiments, the shield may be crimped to the cable. A ferrule may be mounted over the cable in electrical contact with the cable shield, and the connector shield may be crimped around the ferrule. In some embodiments, both the ferrule and the impedance adapter may comprise a sheet of metal that is formed into a tube. The metal used to form the impedance adapter and the ferrule may have the same material properties and thickness, enabling both to economically be formed from strips cut from the same sheet of metal.

Another technique may be used in connectors, such as board connectors formed with a die cast conductive structure configured as a conductive housing. In such a connector, the terminal assembly may be inserted into a cavity in the conductive housing, which may form a portion of the shielding around the terminal assembly. A separate shield member may be inserted into the conductive housing. In some embodiments, an insulative member of the terminal assembly may be formed with a spacer. The connector may be configured such that the spacer establishes the separation between the inserted shield member and one or more electrical conductors in the terminal assembly. The spacer may be a rib, for example. In this way, the components of the connector may be separately manufactured and easily assembled in a way that provides desired electrical properties as a result of establishing a desired signal to ground spacing.

Another technique may provide for mechanical stability of the electrical conductors within a terminal assembly, without introducing changes of impedance that could lead to poor signal integrity. One or more retention features, such as barbs, may be provided on the intermediate portions of electrical conductors that are held within the insulative member of a terminal assembly. Such retention features may be large enough to yield stable contact positioning, including by resisting forces and vibration during normal use of the connector in a harsh environment. Alternatively or additionally, the electrical conductor may be inserted into a channel in the insulative member, and the channel may be narrower in the section encompassing the barb than in other parts of the insulative member. Such a barb, however, may be large enough to appreciably change the impedance along the electrical conductor. An impedance compensation section may be included adjacent the barb. In the impedance compensation section, the electrical conductor may be narrowed.

These techniques may be used singly or in combination. These techniques are illustrated below in connection with an interconnection system that may be used, for example, to make physical connections between assemblies in an automobile.

FIG. 1 is a perspective view of an illustrative interconnection system, in accordance with some embodiments. The interconnection system may be used to connect two electronic devices to one another. In some embodiments, interconnection system 100 is used in high data rate transmission applications (e.g., in applications including ECUs of automotive vehicles). In this example, the interconnection system comprises a board connector 100 mounted to a printed circuit board 160 and a cable connector 200 terminating a cable 213. For simplicity of illustration, only a portion of printed circuit board 160 and of cable 213 are shown.

Figure 2:
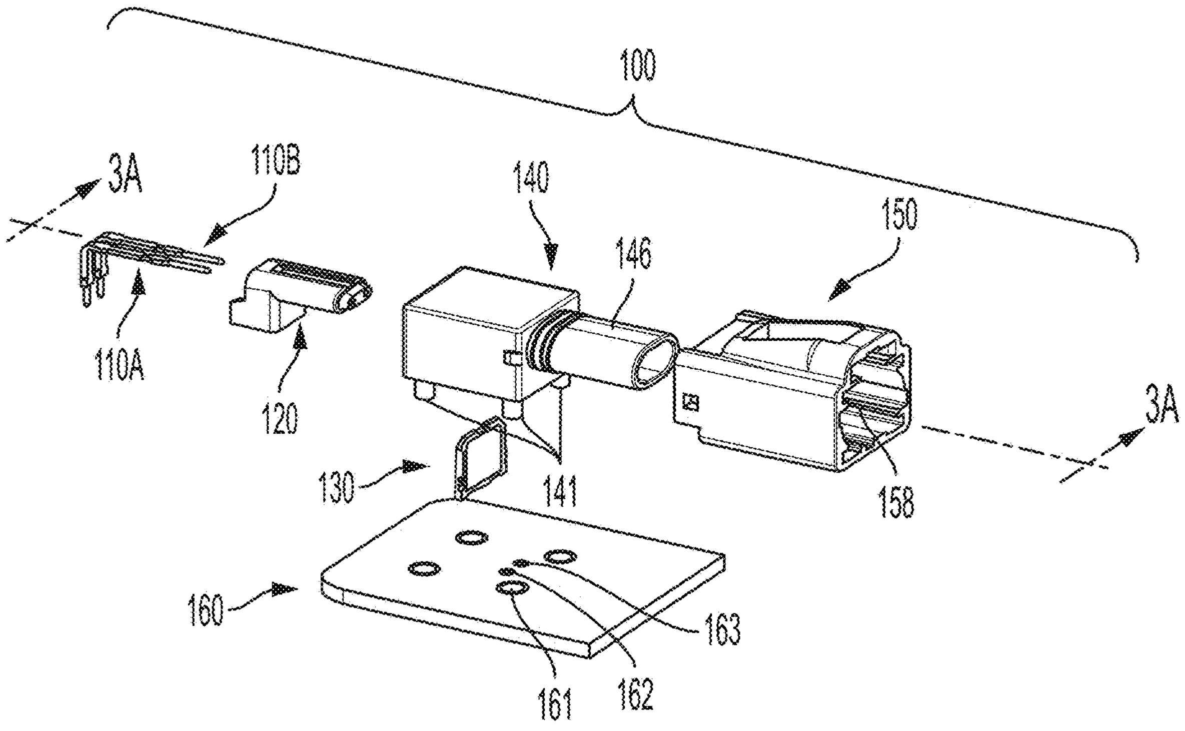
FIG. 2 is an exploded perspective view of board connector 100 of FIG. 1, in accordance with some embodiments.

FIG. 2 is an exploded perspective view of the illustrative board connector 100 of FIG. 1 when not mated to cable connector 200, in accordance with some embodiments. Board connector 100 includes an opening 158 of the housing 150, which may be arranged to allow passage of electrical conductors therethrough. the mating interface of board connector 100 may be disposed within opening 158. As shown in FIG. 1, the mating interface of a second connector, such as cable connector, 200, may be inserted into opening 158 to mate with board connector 100.

Board connector 100 also includes a conductive housing 140. Conductive housing 140 may be a die cast component, for example. In this example, conductive housing 140 has a mating portion 146 that extends into opening 158 when insulative housing 150 is attached to conductive housing 140. In the embodiment of FIG. 2, conductive housing 140 is shown as a unitary component. In other embodiments, conductive housing 140 may be formed of multiple components, which may be joined together or may be held together by an insulative housing or other structures of board connector 100.

Conductive housing 140 may include one or more chambers into which one or more terminal assemblies are inserted, and each terminal assembly may include one or more electrical conductors that serve as terminals for the connector. In this example, conductive housing 140 has one chamber that receives one terminal assembly. A terminal assembly may be formed by insulator 120 and one or more electrical conductors held by insulator 120.

As shown, board connector 100 includes electrical conductors that may serve as signal conductors. In this example, a pair of electrical conductors is shown such that the illustrated terminal assembly is configured for passing a differential signal. In addition to transmitting one or more signals through the connector, the electrical conductors may have mating contact portions at one end, a tail at the opposite end and an intermediate portion therebetween. Accordingly, the electrical conductors may serve as contacts for the connector.

In the example of FIG. 2, the mating contact portions of the electrical conductors are shaped as pins such that board connector 100 is configured as a header. In other embodiments, the mating contact portions of the electrical conductors in a header connector may be shaped as blades or have other shapes. Alternatively or additionally, in some embodiments, a board connector may have electrical conductors with mating contact portions shaped as receptacles.

FIG. 2 illustrates a plurality of electrical conductors, including signal conductors 110A and 110B. The mating contact portions of the signal conductors extend into opening 158. Tails of signal conductors 110A and 110B extend from a mounting interface of board connector 100 for mounting to a substrate, here illustrated as a printed circuit board 160. Signal conductors 110A and 110B may be electrically connected to traces or other conductive structures within printed circuit board 160 via conductively plated holes 162 and 163, respectively, on a board 160.

Opening 158 may be shaped and sized to receive a mating connector therein. The mating connector may similarly include electrical conductors configured to electrically connect to mating contact portions of signal conductors 110A and 110B when the interconnection system is in the mated configuration.

The plurality of electrical conductors may be held within insulator 120 to form a terminal assembly. The insulator may be shaped and sized to receive the electrical conductors. For example, the signal conductors 110A and 110B may pass through openings of insulator 120 and/or may be inserted into channels along a surface of insulator 120. The insulator 120 can be inserted into a cavity within conductive housing 140. In this way, conductive housing will at least partially encircle the terminal assembly and the electrical conductors in the terminal assembly. In this example, the conductive housing substantially encircles the terminal assembly on three sides and the top, as the back and bottom of the conductive housing are open.

Conductive housing 140 may include features to facilitate attachment to the substrate. In this example, one or more attachment posts 141 are configured to electrically and mechanically couple conductive housing 140 to the board 160. For example, the one or more attachment posts 141 may extend into one or more holes 161, which may be ground vias on board 160. By grounding conductive housing 140, the conductive housing may serve as a shield for the terminal assembly and the pair of conductors in the terminal assembly.

The board connector 100 may include one or more further shield members. Here, and further shield is illustrated as shield 130. Shield 130 is also inserted into the cavity of conductive housing 140, to further encircle the terminal assembly. Here, shield 130 is sized to close the back of the cavity and may be installed after the terminal assembly is inserted. Shield 130 is electrically and mechanically coupled to conductive housing 140 such that shield 130 may also be grounded. Shield 130, in conjunction with a spacer on insulator 120, may also serve to position the terminal assembly within the cavity and, in so doing, may establish signal to ground spacing for the electrical conductors within the terminal assembly. Such a configuration may provide a desired and stable impedance.

According to some embodiments, the conductive housing 140 may comprise inward facing surfaces. In some embodiments, at least two of the inward facing surfaces may each comprise a groove 131 (FIG. 3C). The shield 130 may include edges disposed within the groove of the inward facing surfaces such that the shield is held perpendicular to the mounting interface. The shield 130 may be sized to form a friction fit in groove 131, facilitating a mechanical and electrical connection between shield 130 and insulative housing 140.

Figure 3A:
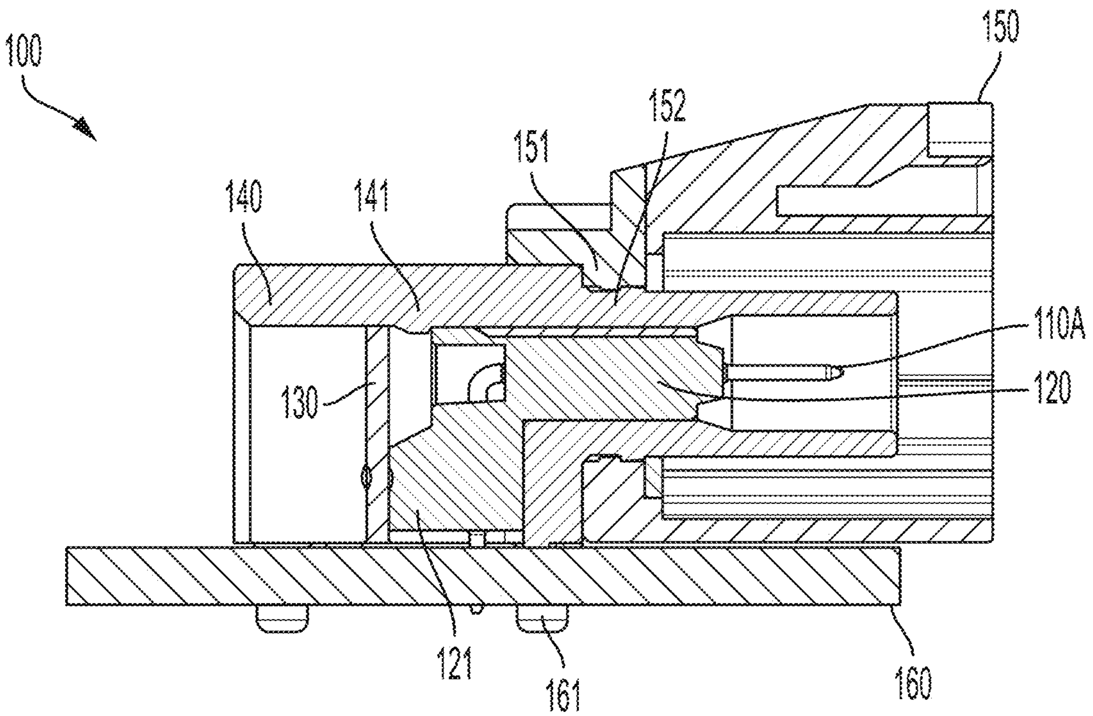
FIG. 3A is a sectional view of the illustrative board connector, in accordance with some embodiments.

FIG. 3A is a sectional view of the illustrative board connector 100 of FIGS. 1 and 2, taken along the line 3A-3A in FIG. 2. In the illustrated embodiment, insulator 120, forming a portion of the terminal assembly, may include a spacer, which is here shaped as a rib 121. The rib 121, or other spacer, positions the terminal assembly with respect to shield 130. The spacer may be sized and arranged to establish a distance between shield 130 and signal conductors 110A and 110B within the terminal assembly. In this example, rib 121 establishes separation between shield 130 and a portion of the signal conductors 110A and 110B perpendicular to board 160, which is parallel to the contact tails of signal conductors 110A and 110B. As shield 130 is a nearby ground for these portions of the signal conductors, this separation is a significant factor in establishing the impedance of those portions of the connector. The appropriate size and shape of rib 121 may be selected to provide a desired impedance. Shield 130 may contact one side of the rib feature 121.

As described herein, the insulator 120 and shield 130 may be engaged in conductive housing 140. Conductive housing 140 and/or insulator 120 may include one or more other features that aid in stably positioning the terminal assembly within conductive housing 140, which contributes to the stability of signals passing through the connector and reduces noise introduced by the connector. In this example, conductive housing 140 includes a retention feature 141 for preventing movement and absorbing force of the insulator 120. The retention feature 141 may be a rib configured to contact a wall of the insulator 120. In the example of FIG. 3A, retention feature has a flat edge, facing towards flat surface of insulator 120. These surfaces engage to establish the position of insulator 120 within conductive housing 140. The opposite edge of retention feature 141 may be relieved, also as illustrated in FIG. 3A, to ease insertion of a terminal assembly into a cavity in insulative housing 140.

Conductive housing 140 may further include features to engage insulative housing 150. In this example conductive housing 140 includes a recess 152. The housing 150 may include a retention feature 151, which is configured to extend into the recess 152 of conductive housing 140. In this example, the recess 152 and corresponding retention feature 151 extend substantially around the perimeter of conductive housing 140.

Figure 3B:
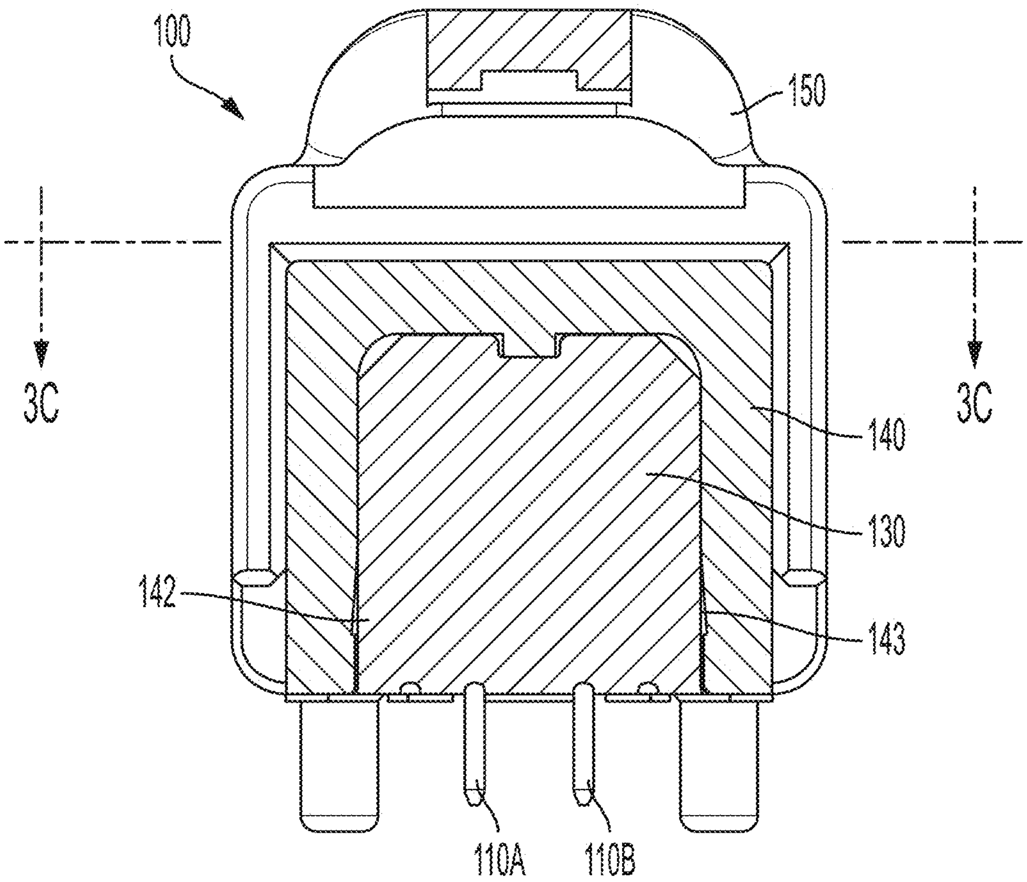
FIG. 3B is a rear view of the board connector of FIG. 3A, in accordance with some embodiments.
Figure 3C:
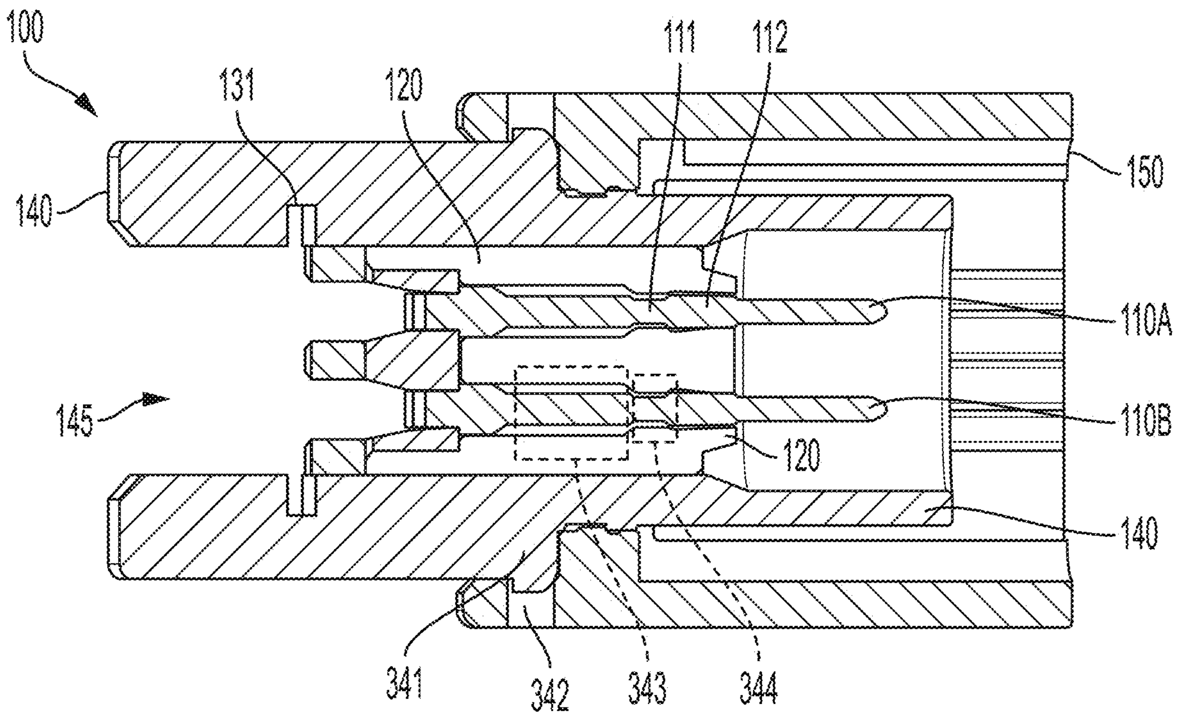
FIG. 3C is a sectional view of the board connector of FIG. 3A, in accordance with some embodiments.

FIG. 3B is a rear view of the board connector 100 of FIG. 3A, in accordance with some embodiments. Either or both of shield 130 and conductive housing 140 may also include retention features that aid in retaining shield 130 in conductive housing 140. Shield 130 may include a bump, embossment, spring finger or other projecting structure that increases the friction between shield 130 and conductive housing 140. Such features may additionally, or in some embodiments alternatively, bias shield 130 forwards so as to press against the spacer of the terminal assembly. In these embodiments, the retention features may project above the rear surface of shield 130.

Alternatively or additionally, conductive housing 140 may have retention features, such as retention features 142 and 143, for retaining shield 130. In this example, retention features are deformable structures that create an interference fit for shield 130. Retention features 142 and 143, for example, may be insulative material within groove 131 ensure a tight fit of shield 130 within conductive housing 140. In this example, retention features may be formed by injecting a thermoplastic or curable material into groove 131. In other embodiments, retention features 142 and 143 may alternatively or additionally be formed by insulative material molded over or otherwise adhered to shield 130.

FIG. 3C is a sectional view of the board connector 100, along the 3C-3C line of FIG. 3B, in accordance with some embodiments. In this view, groove 131, configured to receive edges of shield 130, is visible, but shield 130 is not shown for simplicity.

FIG. 3C also shows the terminal assembly inserted within chamber 145 of the conductive housing 140 is visible. A further retention feature 341 for holding insulative housing 150 to conductive hosing 124 is also visible. The retention feature 341 may comprise a protruding section inserted into a corresponding recess 342 of the housing 150.

Each of the signal conductors 110A and 110B may include one or more retention features configured to prevent movement of the contact in the insulator 120 of the terminal assembly. For example, the signal conductor 110A includes a barb 112, configured to provide retention of the contact within the insulator. In this example, insulator 120 includes a channel receiving each of the signal conductors 110A and 110B. The barb 112 digs into the insulator at the side of the channel to firmly retain the contact. In this example, the channels are narrower proximate barb 112 and wider away from the barb. The channel receiving signal conductor 110A may be provided parallel to the channel receiving signal conductor 110B.

In some embodiments, the barb and/or the width of the channel may appreciably impact impedance along signal conductor 110A and 110B. The signal conductors and/or insulator may be provided with an impedance compensation section proximate the retention feature. In this example, the impedance compensation section is formed by a narrowing portion 111 on each of the signal conductors 110A and 110B.

In the illustrated embodiment, signal conductors 110A or 110B have the same shape. Accordingly, they may have the same retention features and same impedance compensation sections. Similarly, the channels receiving each of the signal conductors 110A and 110B may have the same shape such that the channels are both narrower proximate the barb 112 and wider away from the barb. For example, in FIG. 3C, the channel for signal conductor 110B has a first portion 343, having a first width, and a second portion 344, having a second width. The second width is narrowed than the first width. The narrower portions, for example, may provide suitable retention, while the wider portions may provide desired electrical properties, such as impedance and/or loss.

Figure 3D:
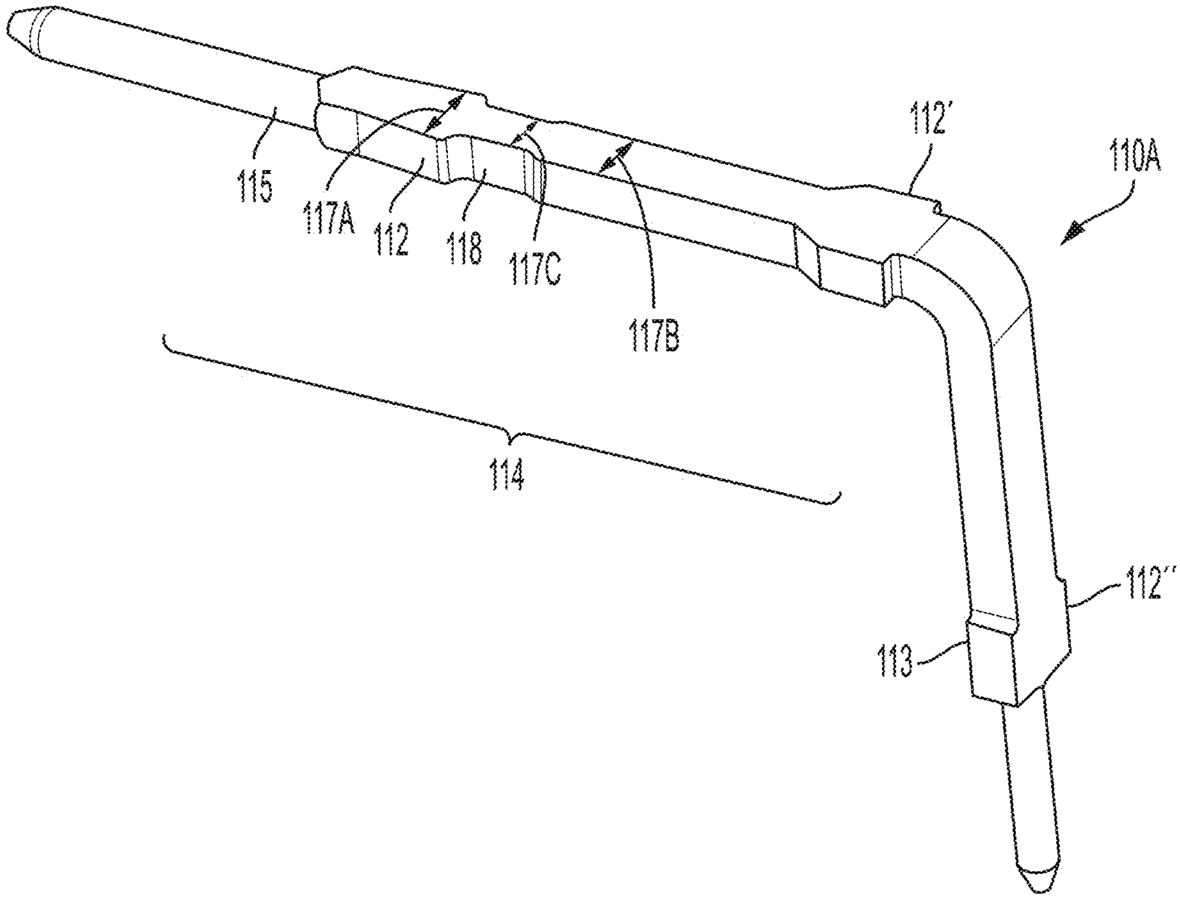
FIG. 3D is a perspective view of an electrical contact of the board connector of FIG. 3A, in accordance with some embodiments.

FIG. 3D is a perspective view of an electrical contact of the board connector of FIG. 3A, in accordance with some embodiments. Electrical signal conductor 110A may comprise a mating contact portion 115, tail 113, and an intermediate segment 114 joining the mating contact portion 115 and the tail 113. The intermediate segment has a first width 117B for over 50% of its length within the channel and is disposed within the channel.

The intermediate segment may also include barb 112. The barb may have a width 117A greater than the width 117B of the intermediate segment. The barb 112 may engage the insulative member 120. The intermediate segment may further include a conductor portion 118, proximate the barb 112 having a third width 117C, narrower than the first width 117B. According to the example of FIG. 3D, the mating contact portion 115 and tail 133 may extend in perpendicular, or substantially perpendicular, directions. In some embodiments, portions of the intermediate segment of the electrical conductor 110B are disposed in the first portion 343 of the corresponding channel. In some examples, the conductor portion is disposed within the second portion 344 of the corresponding channel. Similarly, portions of the intermediate segment of the electrical conductor 110A are disposed in a portion corresponding to the first portion 343 of the channel receiving conductor 110A.

In the example of FIG. 3D, barb 112 is at an end of the intermediation segment near the mating contact portion. There may be more than one retention feature along the length of a signal conductors. Each retention feature, and the impedance compensating sections proximate the retention feature, may be similarly shaped. However, in some embodiments, the retention features along the length of a contact may have different sizes or different shapes.

According to some embodiments, the connector 100 is a right angle connector. In some examples, the mating interface of board connector 100 disposed within opening 158 may be at a right angle to the mounting interface for mounting to the printed circuit board 160. According to some embodiments, the shield member may be aligned perpendicular to the mounting interface. The mating contact portions and tail portions of signal conductors 110A and 110B may each extend from their respective channels in an orthogonal direction.

FIG. 3D illustrates a signal conductor 110A shaped for use in a right angle, board mounted connector. In addition to barb 112, there is a second barb 112' near a bend in the signal conductor and a further retention feature 112" near the tail.

Figure 4A:
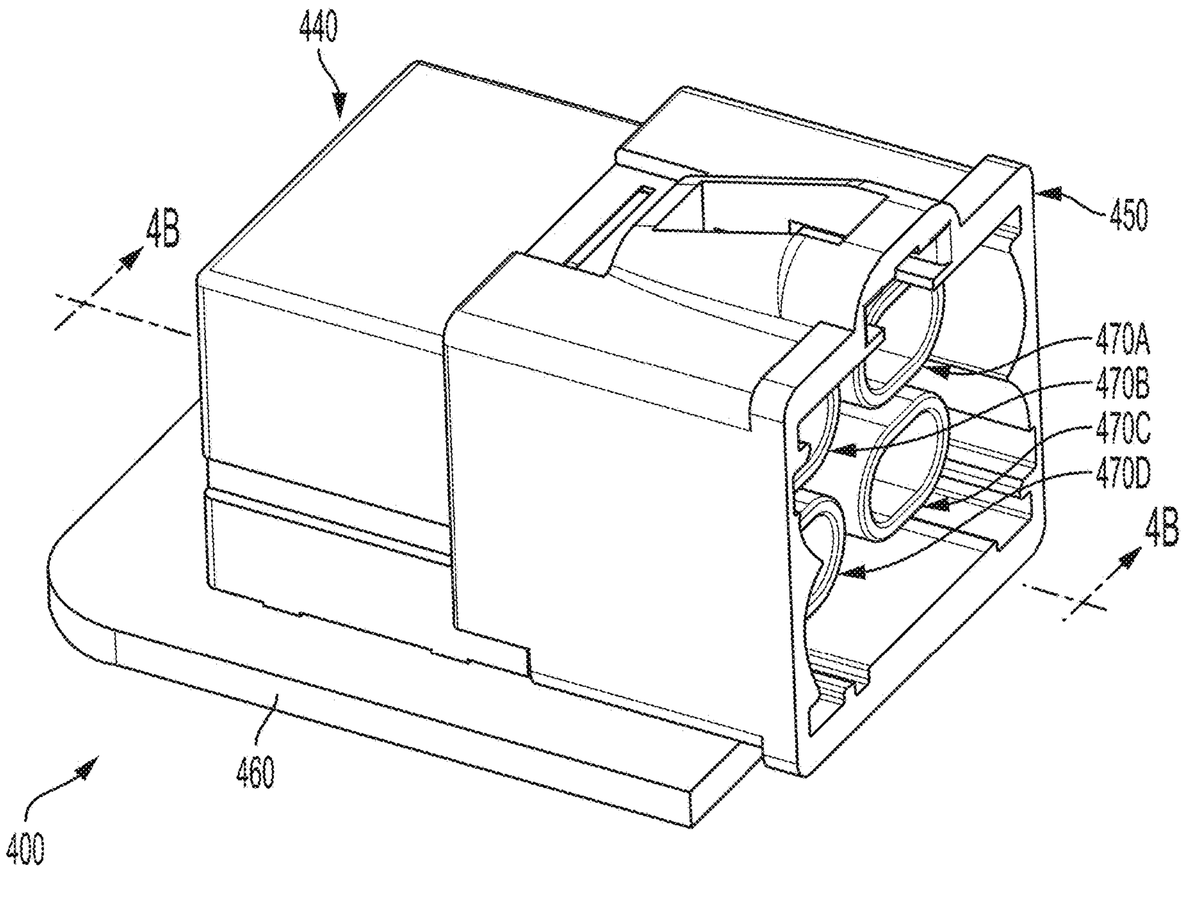
FIG. 4A is a perspective view of an illustrative multiport board connector, in accordance with some embodiments.

The board connector illustrated in FIGS. 2-3D is configured for passing a differential signal. It has one port configured for passing one differential signal. In other embodiments, similar connector construction techniques may be used to construct a connector suitable for passing multiple differential signals. FIG. 4A is a perspective view of an illustrative multiport board connector 400, in accordance with some embodiments. For example, FIG. 4A shows a 2 by 2 connector 400 including 4 ports arranged in two rows of two ports.

Connector 400 similarly includes an insulative housing and a conductive housing. The conductive housing is shown with ports 470A-D, each of which is configured to receive a mating element therein. Each of the ports may have the same configuration as the mating portion 146 of board connector 100, such that the same mating elements may mate with either connector. As with board connector 100, conductive housing 440 is configured to be mounted to a board 460. An insulative housing 450, providing the same functionality as insulative housing 150 for a larger connector is attached to conductive housing 440.

Figure 4B:
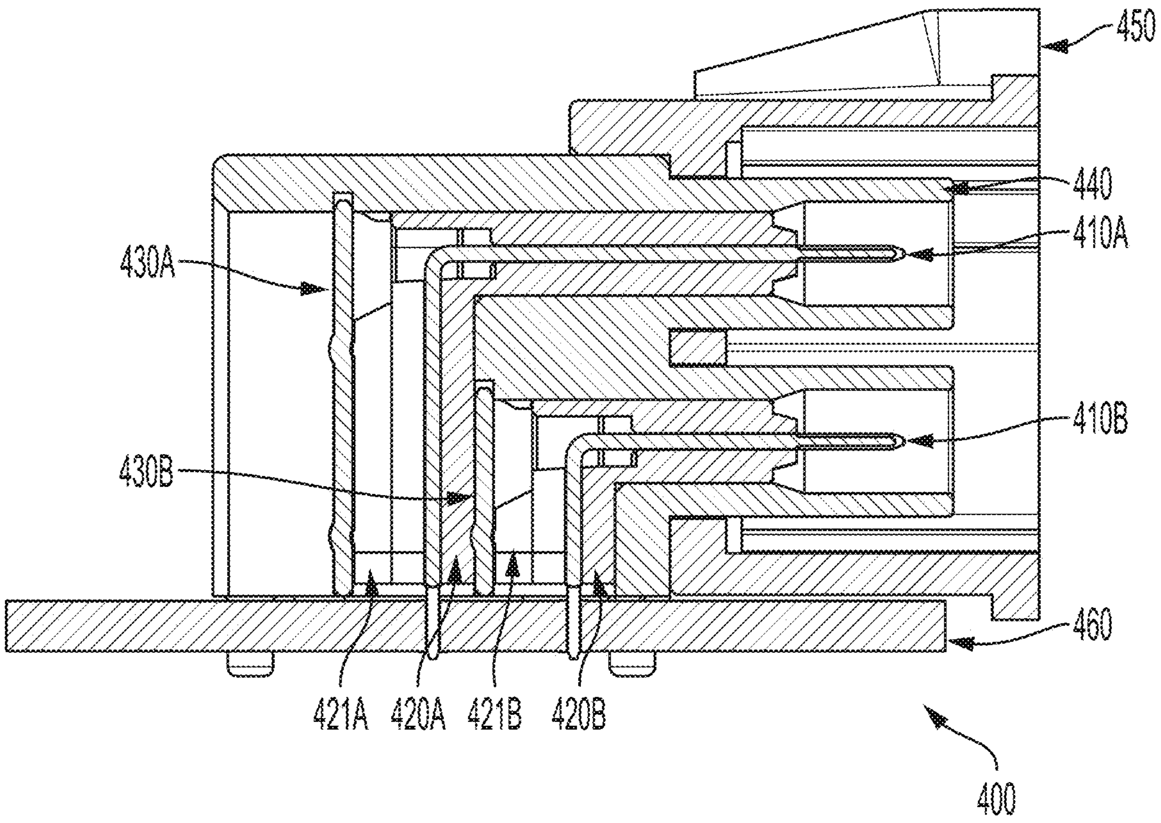
FIG. 4B is a cross sectional view of the multiport board connector of FIG. 4A taken along the line 4B-4B in FIG. 4A.

FIG. 4B illustrates a portion of the cross sectional view along the line 4B-4B of FIG. 4A, in accordance with some embodiments. In the view of FIG. 4B, a contact in each of two of the ports is visible. As with connector 100, connector 400 has a pair of contacts in each port. In this example, the contacts in each port are held in a separate insulator, such that there are four terminal assemblies, one for each of the ports. In the illustrated embodiment, a shield corresponding to each of the terminal assemblies may be inserted into conductive housing 440 blocking removal of the terminal assembly. However, in some embodiments, the components forming structures of multiple ports may be combined. For example, an insulator may hold signal conductors for two or more ports or a shield may be inserted behind insulators for two or more ports.

The insulators for the terminal assemblies of connector 400 may have the same functions as insulators 120 described above for connector 100. For example, electrical conductor 410A is disposed in insulator 420A comprising a rib 421A that serves as a spacer. Electrical conductor 410B is disposed in insulator 420B comprising a rib 421B. Ribs 421A and 421B each positions its respective terminal assemble relative to a respective shield 430A and 430B. The ribs 421A and 421B may perform the same function as rib 121 described above for connector 100. Each of the shields 430A-B and insulators 420A-B are engaged in the conductive housing 440, which is further disposed in an insulative housing 450.

While exemplary embodiments show a 1 by 1 board connector having 1 port and a 2 by 2 multiport board connector having 4 ports, a multiport board connector may include any number of ports having any configuration. For example, in an alternative embodiment, the multiport board connector may include 6 ports, for example a 2 by 3 connector, having 6 ports arranged in three rows of two ports. Regardless of the number of ports, each of the ports may have the same configuration as the mating portion 146 of board connector 100.

For example, the conductive housing may include more than one chamber disposed in a row. For example, in the example of FIG. 4A, port 470C corresponding to a first chamber and port 470D corresponding to a second chamber are disposed in a row in a first direction. A shield member may be disposed within each of the chambers, such as shield member 130. The shield member may be electrically and/or mechanically engaged to the conductive housing. In some examples, the shield members each comprise a planar portion extending in a direction parallel to the first direction in which the rows of chambers are disposed. In such an embodiment, the shield may extend in the row direction a sufficient distance to align with multiple chambers, such that there are fewer shields than there are chambers.

In some embodiments, a terminal assembly may be disposed in each respective chamber, such as described herein. In some examples, each of the terminal assemblies comprises a spacer adjacent the planar portion of a respective shield member.

As described herein, the conductive housing may include more than one chamber disposed in a row. It may also include more than one row. For example, in FIG. 4A, the connector includes a first row comprising chambers corresponding to ports 470C and 470D and may also include a second row comprising chambers corresponding to ports 470A and 470B. As described herein, each terminal assembly may comprise one pair of electrical conductors, where each electrical conductor of the pair may be positioned the same distance from an adjacent shield member by the spacer of the terminal assembly.

A connector having a mating interface as described above may mate with a second connector having a complementary mating interface. The complementary mating interface may similarly include one or multiple ports. The mating interface for each port of the second connector, for example, may include a shield at least partially enclosing a cavity in which a terminal assembly is disposed. The terminal assembly may include signal conductors with mating contact portions aligned to mate with the mating contact portions of the signal conductors of a first connector, as described above. In mating the second connector to the first connector, the shield of the second connector may fit within the chamber of the conductive housing, making electrical and mechanical contact between the conductive housing and the shield. Likewise, electrical and mechanical connections may be formed between the signal conductors of each port of the first connector and the corresponding port of the second connector.

Figure 5:
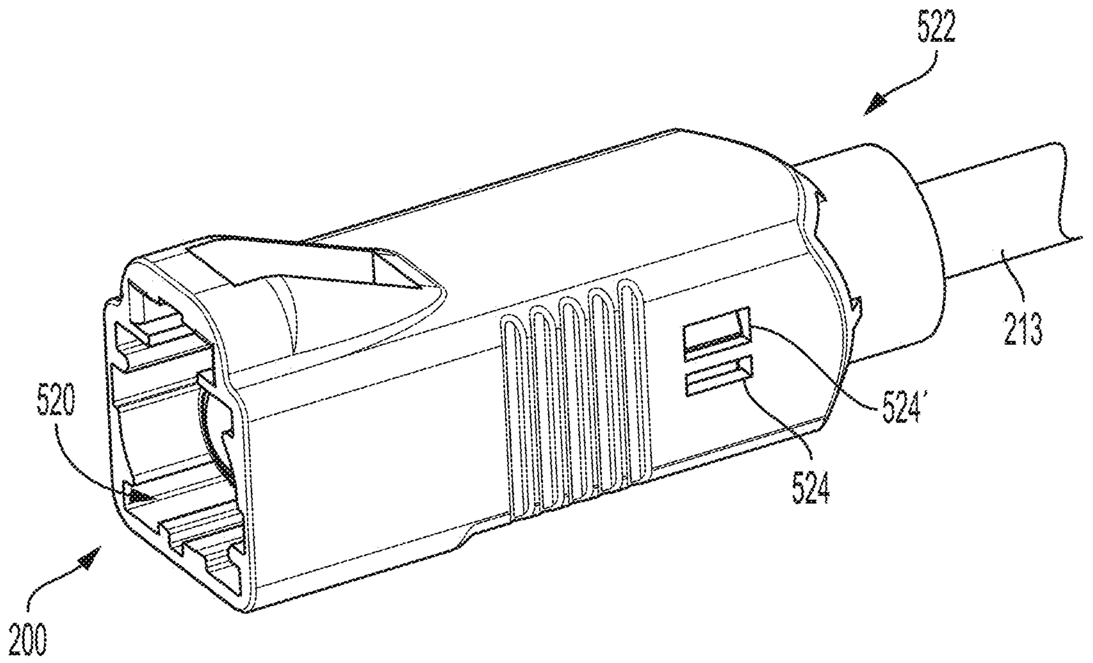
FIG. 5 is a perspective view of cable connector 200 of FIG. 1, in accordance with some embodiments.

The second connector may be, for example, a cable connector. FIG. 5 is a perspective view of cable connector 200, in accordance with some embodiments. Cable connector 200 is a single port connector and is configured to mate with single port board connector 100, as illustrated in FIG. 1.

Cable connector 200 may have components similar to those described above for board connector 100, including an outer insulative housing, an inner conductive housing that acts as a shield and a terminal assembly inside a cavity within the shield. The outer insulative housing, however, may have a mating interface and latching features that are complementary to those on board connector 100 such that cable connector 200 may mate with board connector 100. Likewise, inner conductive housing may have a mating portion configured for mating with mating portion 146. Further, the terminal assembly, as well as other components, may be configured for terminating a cable 213 rather than mounting on a printed circuit board. For example, the contacts may be electrically coupled to one or more conductors of a cable.

Figure 6:
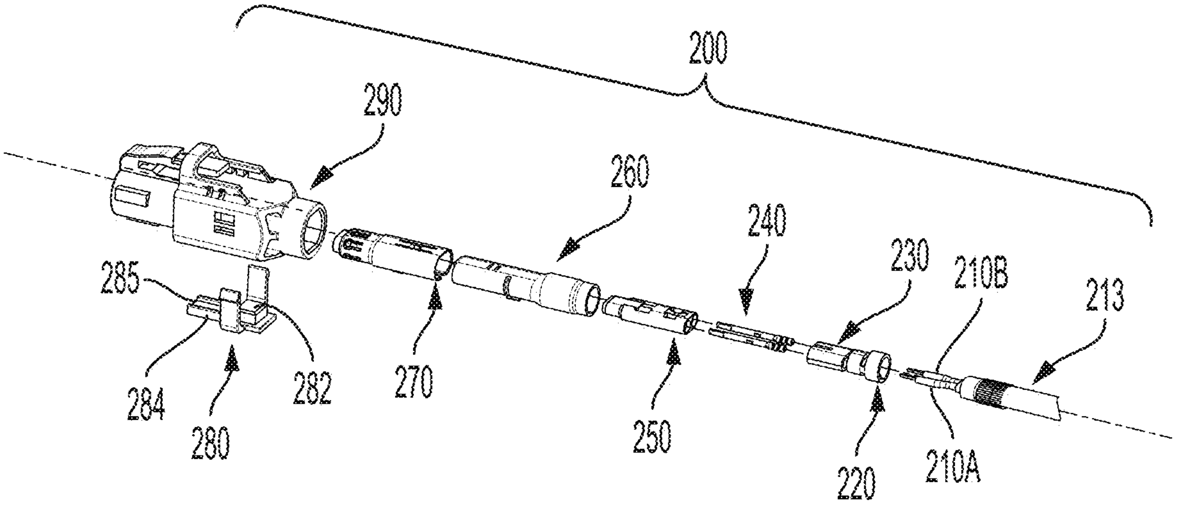
FIG. 6 is an exploded perspective view of the cable connector of FIG. 5, in accordance with some embodiments.

FIG. 6 is an exploded perspective view of an illustrative cable connector 200, in accordance with some embodiments. As illustrated in FIGS. 5 and 6, the illustrative cable connector 200 is configured to terminate cable 213. Cable connector 200 comprises a mating end 520 and a cable termination end 522 opposite the mating end. A cavity 279 (FIG. 9B) is open at the mating end 520. The connector terminates cable 213 at the cable termination end 522.

The end of the cable may be manipulated to facilitate termination to connector 200. The bulk of the cable may comprise one or more insulated conductors, here shown as insulated conductors 210A and 210B. In the example provided, the cable contains a pair of insulated conductors surrounded by a cable shield, which is then covered by an insulative jacket. The cable shield, for example, may be a braided shield. For termination, the jacket may be removed, exposing the cable shield. The insulated conductors may be separated and at the distal ends, the insulator may be removed at the ends of the conductors. For cables in which the insulated conductors are twisted together in the bulk cable, separating the insulated conductors may also involve untwisting the conductors.

This manipulation of the cable enables the conductors of the insulated conductors to be attached to terminals of a connector. The terminals 240 may be crimped to the conductors of the cable. The terminals may be a portion of a terminal assembly with an insulator, here illustrated as a contact carrier housing 250. Housing 250, for example, may be formed around terminals 240 with their crimp ends exposed, for example, or terminals 240 may be inserted into holes in housing 250 after crimping to conductors of cable 213.

The conductive inner housing of cable connector 200 is here shown formed from back shield 260 and front shield 270, which may be electrically and mechanically coupled. The front shield 270 may include a mating interface for mating to a complementary connector and the rear shield 260 may be crimped to the cable and may be electrically coupled to the cable shield. The cable connector 200 further includes ferrule 220. A portion of the cable shield (not shown in FIG. 6) exposed by removing a portion of the cable jacket may be folded over ferrule 220 and then rear shield 260 may be crimped around ferrule 220, forming a connection between the cable shield and connector shield.

The cable connector 200 further includes impedance adaptor 230 which may be disposed around the cable 213. According to some embodiments, the impedance adaptor may be metal and may be in electrical contact with the connector shield. Impedance adaptor 230 is closer to the insulated conductors of cable 213 than the connector shield and may substantially cover the portions of the insulated cable conductors from which the cable shield has been removed or folded back. Impedance adaptor may be spaced from the cable conductors to provide an impedance matching the impedance of the conductors within the bulk of the cable.

These components, terminals 240 attached to conductors of cable 213, contact carrier housing 250, ferrule 220, impedance adapter 230, rear shield 260, front shield 270 may be assembled together as a subassembly. The subassembly may be inserted into cable connector housing 290. Features on that subassembly may engage with features on the housing 290. The subassembly may be locked within housing 290 using a contact carrier position assurance (CCPA) 280. When the subassembly is inserted into the desired position within housing 290, CCPA 280 may be pressed into housing 290, and block withdrawal of the subassembly. If the subassembly is only partially inserted into housing 290, the subassembly may block insertion of CCPA 280.

Figure 7:
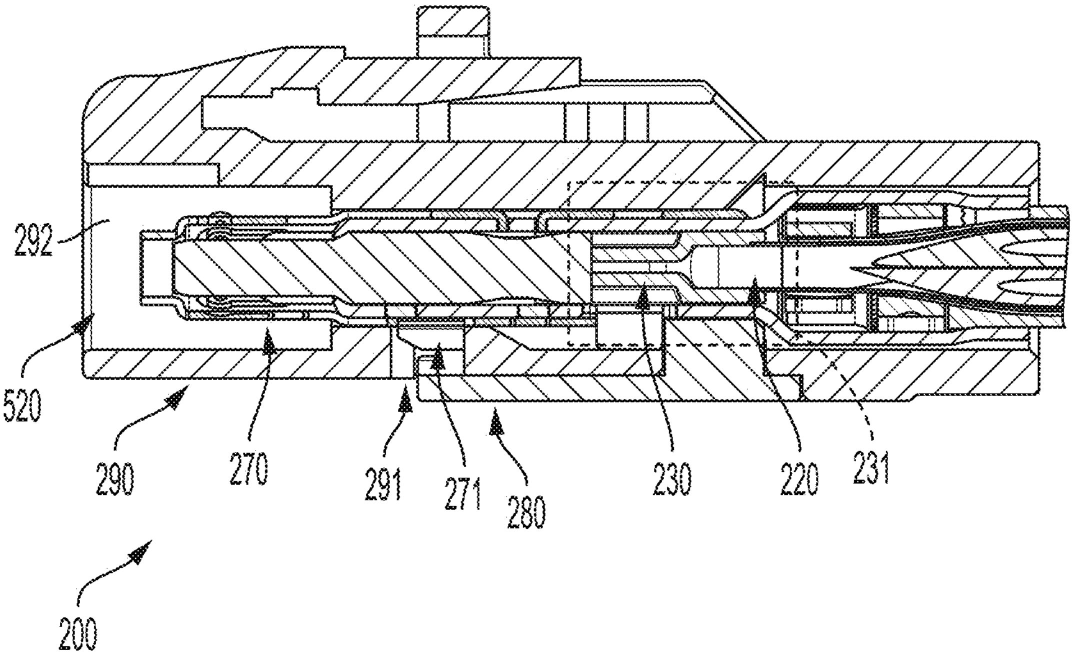
FIG. 7 is a sectional view of the illustrative cable connector of FIG. 6, in accordance with some embodiments.

FIG. 7 is a sectional view of the illustrative cable connector of FIG. 6, in accordance with some embodiments. The impedance adaptor 230 is in the separated and/or untwisted area 231 of the cable termination. The area 231, where the cable has been manipulated, provides space to perform the crimping process of the contacts to the conductors of the cable. However, this manipulation of the cable modifies the impedance of the conductors. Impedance adaptor 230 is provided in proximity to the cable in order to prevent this change of impedance. The impendence adaptor brings metal closer to the conductors of the cable. In the illustrated embodiments, the impedance adaptor will also be in contact with the back shield which connects the impedance adaptor to ground, establishing the signal to ground spacing for the conductors of the cable, which in turn establishes a desired impedance to match the impedance of the bulk cable. As used herein, impedances need not be identical to be matched. Rather, the impedances may be sufficiently close so as not to provide an impedance discontinuity that disrupts performance. For example, matched impedances may be within +/−5% or within +/−3 Ohms, in some embodiments.

To terminate cable 213, the cable end may be prepared for termination and inserted through ferrule 220 and impedance adapter 230. The cable shield may be folded over ferrule 220 and the conductors of cable 213 may be crimped to terminals 240. Terminals 240 may then be inserted into contact carrier housing 250. Back shield 260 may then be crimped around ferrule 220. Front shield 270 may then be engaged to back shield 260 and latched in place. These components may form a terminated cable subassembly that is inserted into housing 290. The housing 290 may include an opening 292 to receive the terminated cable subassembly.

The terminated cable subassembly may be latched to housing 290, such as by latching a beam in the housing to a tab extending form one of the connectors shields. The housing 290, for example, may include a beam 294 comprising a cantilevered end 291 and a latch 293 at the cantilevered end 291 that extends into the opening 292. The latch 293 may have camming surface 295 and the tab of the terminated cable subassembly may have a forward edge that is tapered. As the terminated cable subassembly is inserted into housing 290, the tapered surface of the tab may engage the camming surface of latch 293, forcing latch 293 upwards, until the rear edge of the tab clears the camming surface. In that position, the spring force in deflected beam 294 will push the beam downwards, latching the tab in place.

Alternatively or additionally, a position assurance device may be used to engage the terminated cable subassembly in the housing 290. For example, a contact carrier position assurance (CCPA), once engaged, may provide further mechanical integrity by interfering with motion of the beam in a direction that would unlatch from the tab. In the illustrated embodiment, CCPA 280 has two latch arms 284 (FIG. 6), each with a hooked latch at the distal end. Housing 290 has two windows 524 and 524' on each side (FIG. 5), each of which can receive the hooked latch end of latch arm 284. In the operating state illustrated in FIG. 5, CCPA 280 is fully inserted into housing 290 and the hooked ends of latch arms 284 are latched in windows 524'. In this state, the terminated cable subassembly may be locked into housing 290. If CCPA 280 is only partially inserted into housing 290, the hooked ends of latch arms 284 may be latched in windows 524. In this state, the terminated cable subassembly may be inserted into housing 290.

Figure 8A:
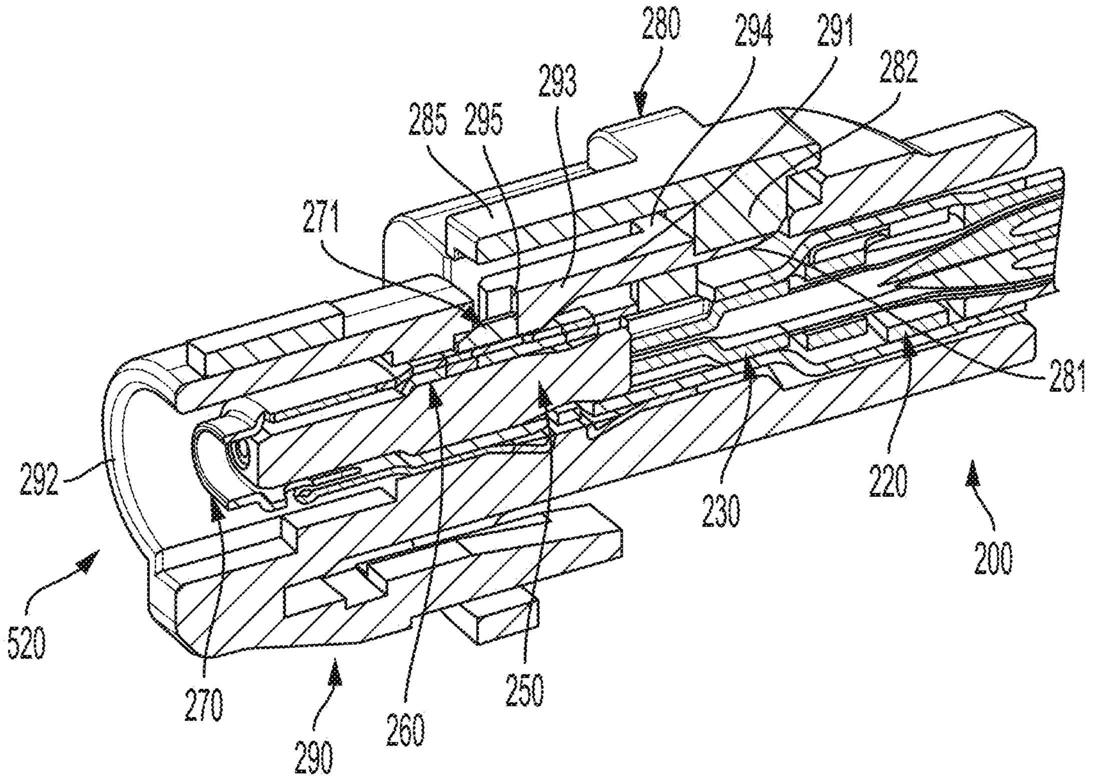
FIG. 8A is a perspective sectional view of the cable connector of FIG. 6 with the carrier contact position assurance device (CCPA) partially inserted, in accordance with some embodiments.

FIG. 8A is a perspective sectional view of the cable connector of FIG. 6 with a contact carrier position assurance (CCPA) in a partially inserted state. The CCPA may comprise a member 282 that can be inserted into an opening 281 in the connector housing 290. In the partially inserted state, member 282 does not block opening 281, providing clearance for a terminated cable subassembly to be inserted properly into housing 290. The CCPA may also comprise a beam backing member 285 that can be block deflection of beam 294. However, in the partially inserted state of FIG. 8A, beam backing member 285 is separated from beam 294, such that beam 294 may yield sufficiently to enable tab 271 to be pushed past latch 293, such that latch 293 may engage tab 271 when the terminated cable subassembly is inserted into housing 290.

Figure 8B:
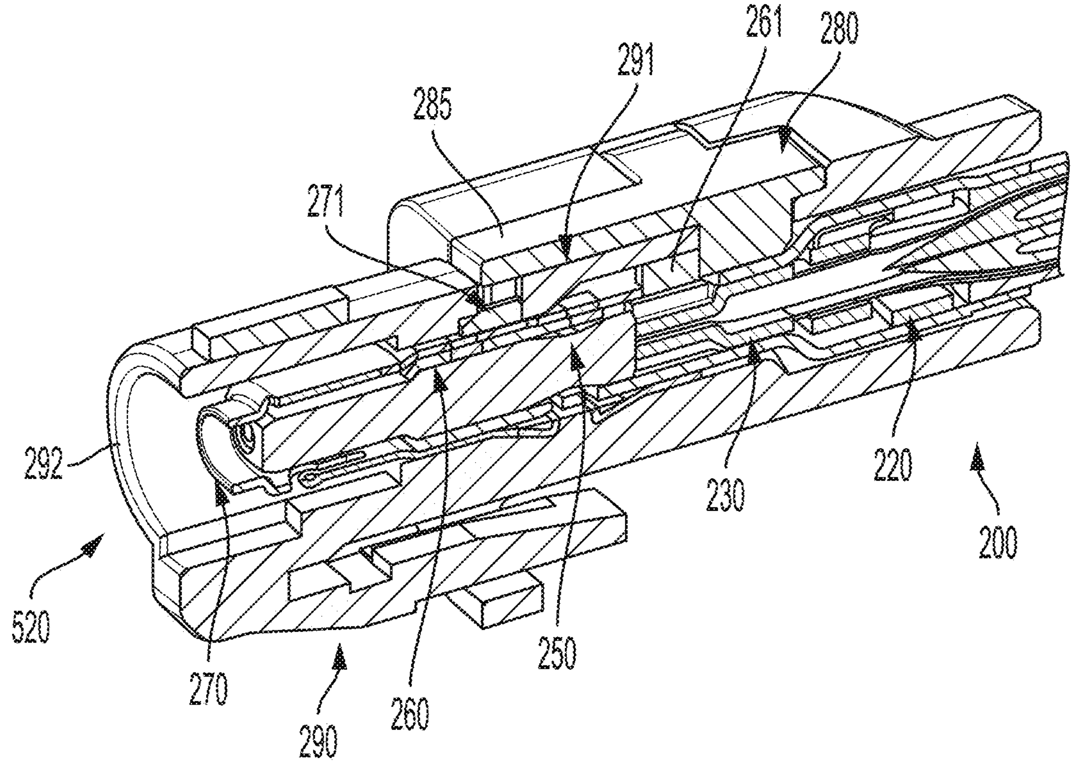
FIG. 8B is a perspective sectional view of the cable connector of FIG. 6 with the carrier contact position assurance device (CCPA) fully inserted, in accordance with some embodiments.

When the terminated cable subassembly is inserted properly into housing 290, a tab of the back shield will be forward of the opening 281. The CCPA can secure the contact carrier housing 250 in the housing 290 by blocking reward motion of the tab of the rear shield. FIG. 8B is a perspective sectional view of the cable connector of FIG. 6 with the contact carrier position assurance (CCPA) fully inserted, in accordance with some embodiments. The latch 293 feature of tab 271 may provide a stopping function configured to prevent the front shield 270 and the components of the connector disposed within the cavity formed by the front shield 270 from moving in relation to the connector housing 290. Further, in this state, beam backing member 285 prevents movement of beam 294, such that beam 294 will not yield sufficiently to enable latch 293 to disengage tab 271.

Figure 9A:
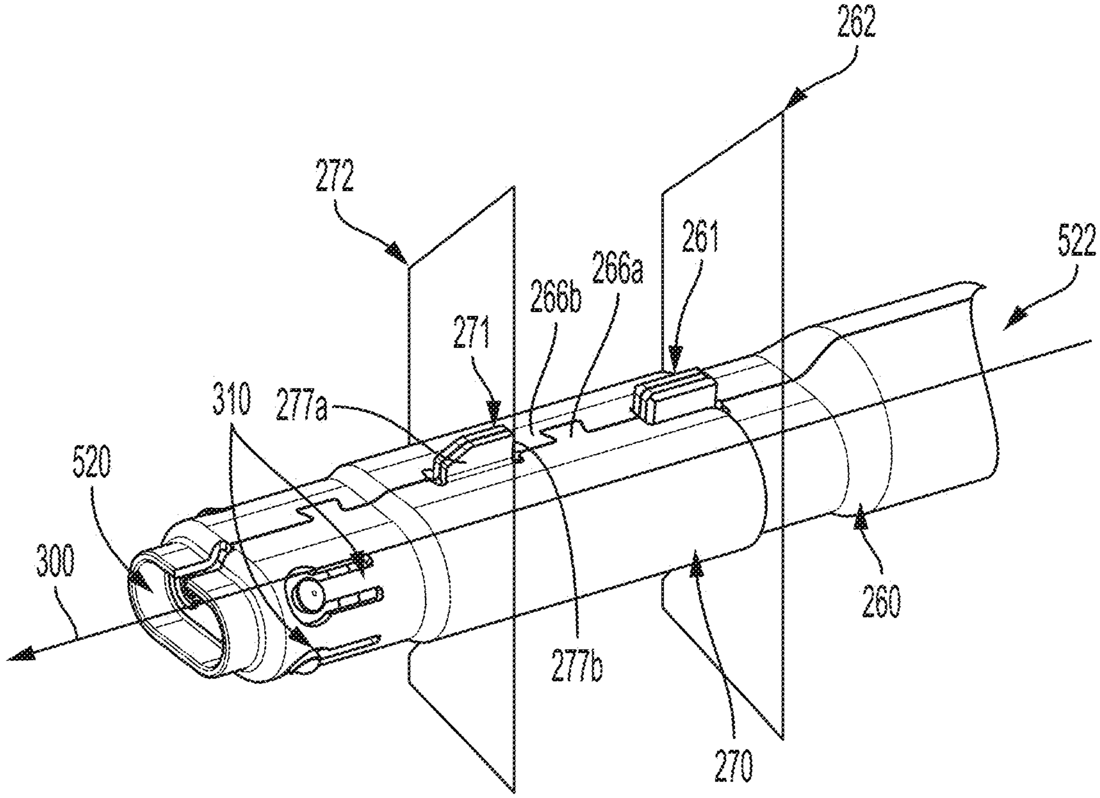
FIG. 9A is a perspective view of an illustrative back shield of the cable connector of FIG. 6 connected to an illustrative front shield of the cable connector, in accordance with some embodiments.

FIG. 9A is a perspective view of an illustrative back shield of the cable connector of FIG. 6 electrically and mechanically connected to an illustrative front shield of the cable connector, in accordance with some embodiments. As described herein, shield components such as front shield 270 and back shield 260 may each be constructed by forming a sheet of metal into a tube that at least partially encircles a cavity with a perimeter bounded by the sheet. The first edge may be joined to the second edge of the metal sheet. In the illustrated embodiment, the first edge buts against the second edge such that the resulting tube substantially encircles the cavity.

One or more electrically conductive terminals may be disposed within the cavity. In the example of FIG. 9A, a pair of signal terminals may be disposed within the cavity, such as terminals 240, which may be shaped as receptacles to mate with the pins of signal conductors 110A and 110B.

In some examples, the first and second edge of the metal sheet may have one or more interlocking features such as one or more interlocking protrusions and openings. For example, the front shield 270 has a protrusion **266*a* and a corresponding opening 266*b*. When forming front shield 270, the first and second edge can be joined such that the protrusion 266*a* is fitted to the opening 266*b*** such that once interlocked, further mechanical integrity can be provided to the resulting tube.

The sheet may also be stamped and formed to provide a tab extending away from the cavity in a direction orthogonal to the perimeter. Forming the shield component in this way may simplify a manufacturing process. According to some embodiments, the tab may extend from the sheet at the first edge. In some embodiments, the tab may be formed from a first tab portion extending from the sheet and/or a second tab portion extending from the sheet. Forming a tab at the edge of the sheet avoids forming holes in the sheet, which may enhance the shielding effectiveness of the resulting shield.

In some embodiments, the tab may be constructed from a first and second tab portion. The first tab portion may extend from the first edge of the sheet and the second tab portion may extend from the second edge of the sheet. In some examples, the tab portions may be bent such that the first tab portion is parallel and adjacent to the second tab portion. In this state, the two tab portions may be crimped or otherwise joined together to provide greater integrity to the tab and/or the shield. In some embodiments, the tab may be formed at the first and/or second edge, and the tab may be configured to form a latching feature, which may engage with a complementary latching feature (such as a beam) of a connector housing and or may be engaged by a portion of a CCPA. In the example of FIG. 9A, a tab 261 extends from both edges of the sheet forming back shield 260 and comprises a latching feature. A tab 271 extends from both edges of the sheet forming front shield 270 to form another latching feature. Multiple latching features enables multiple ways to secure the terminated cable subassembly. Tab 271 may be latched by a beam inside housing 290 and tab 261 to engage with a CCPA, for example.

According to some embodiments, the front shield 270 has an axis of elongation 300 and is concentric with and electrically connected to the back shield 160. The tab 261 of the back shield may be aligned with the tab 271 of the front shield 270 in the direction of the axis of elongation 300.

Tab 271 has a first edge **277*a* facing the mating end 520 and a second edge 277*b* opposite the first edge. The first edge 277*a* may be tapered towards the mating end of the connector and the second edge 277*b* may be orthogonal to the perimeter 278. The tapered edge 277*a* may form a camming surface that deflects a beam during insertion of the terminated cable subassembly into housing 290, as described above. When shield 270 is disposed in the housing 290, by inserting the shield into the opening, the beam 294 of the housing is configured such that the latch 293 at the cantilevered end 291 is aligned with the second edge 277*b* of the tab 271 when the shield 270 is fully inserted into the opening. In some embodiments, when the front shield 270 is partially inserted into the cavity 279 of housing 290, the beam 294 is configured such that the first edge 277*a* of the tab 271 is aligned with the camming surface 295 of the latch 293**.

In some embodiments, one or more tabs may extend to form a stop for contact against a housing of the connector. Alternatively or additionally, one or more tabs of the shield and corresponding recesses in a housing 290 of the connector may be used as guides for connecting the shield and housing. For example, the latch features may be provided on one side of the shield with the corresponding recesses on one side of the housing. This may allow the latching features to slide into the respective recesses, thus guiding the shield into the housing in the proper orientation (e.g., the correct polarity).

According to some embodiments, in the terminated cable subassembly, contact carrier housing 250 extends into the cavity 279 of front shield 270. The front shield 270 encircles the mating ends of terminals 240. The front shield 270 comprises contact beams 310 configured for mating with a ground structure of a complementary connector, such as board connector 100. In some embodiments, the contact beams 310 of the front shield 270 are electrically coupled through the front shield 270, the embossment 962 and the back shield 260 to the cable shield. In the illustrated embodiment, the beams 310 are on a distal portion of the front shield 270 and have contact surface that extend radially outwards for mating with a conductive housing of a mating connector upon insertion into a chamber forming a port of that connector.

Figure 9B:
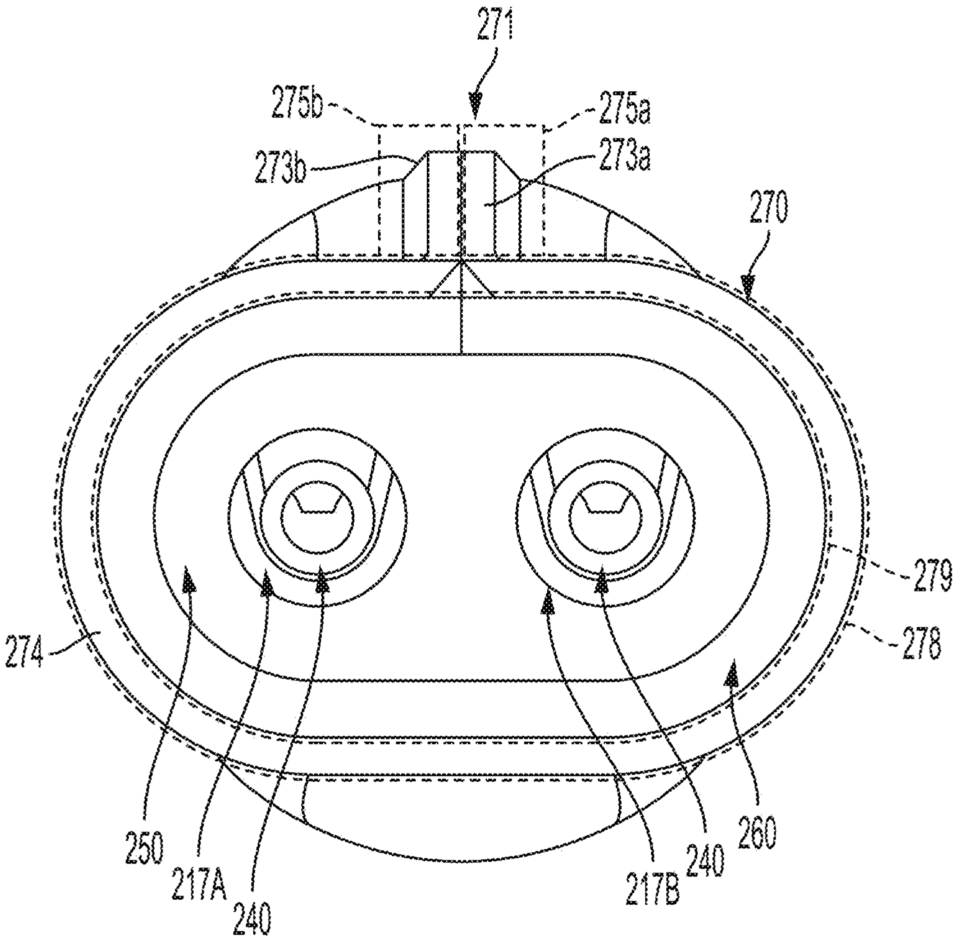
FIG. 9B is a sectional view of the cable connector of FIG. 9A, in plane 262 in FIG. 9A, in accordance with some embodiments.

FIG. 9B is a sectional view of the cable connector of FIG. 9A, taken along the 272 plane in FIG. 9A, in accordance with some embodiments. As described herein, the sheet 274 of the front shield 270 has a first edge 273*a* and a second edge 273*b*. The first edge 273*a* of the sheet 274 of the front shield 270 is joined to the second edge 273*b* of the sheet 274 to at least partially encircle the cavity 279 with a perimeter 278 bounded by the sheet. In the cross section of 9B, the tab 271 of the front shield 270, comprising a latching feature, is visible.

The tab 271 extends away from the cavity 279 in a direction orthogonal to the perimeter 278. The tab 271 may include a first tab portion 275*a* extending from the sheet 274 at the first edge 273*a* and/or a second tab portion 275*b* extending from the sheet 274 at the second edge 273*b*. The first tab portion may be parallel and adjacent to the second tab portion.

In the example of FIG. 9B, a portion of the back shield 260 is inserted into cavity 279. The front shield 270 is concentric with and electrically connected to back shield 260.

Figure 9C:
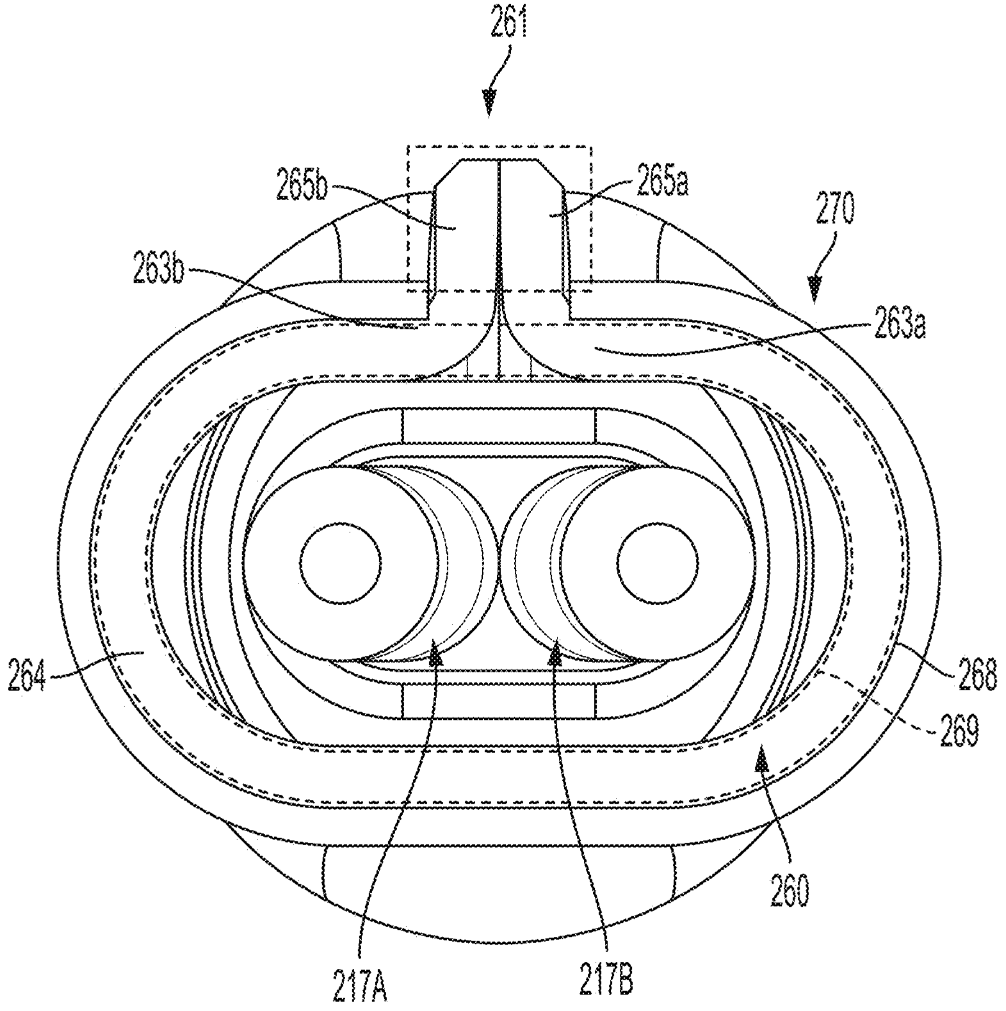
FIG. 9C is a sectional view of the cable connector of FIG. 9A, in plane 272 in FIG. 9A, in accordance with some embodiments.

FIG. 9C is a sectional view of the cable connector of FIG. 9A, taken along the plane 262 in FIG. 9A, in accordance with some embodiments. As described herein, the sheet 264 of the back shield 260 has a first edge 263*a* and a second edge 263*b*. The first edge 263*a* of the sheet 264 of the back shield 260 is joined to the second edge 263*b* of the sheet 264 to at least partially encircle a portion 269 of cavity 279, with a perimeter 268 bounded by the sheet. In the cross section of 9C, the tab 261 of the back shield 260 comprises a latching feature. The back shield has axis of elongation 301.

The tab 261 extends away from the cavity 279 in a direction orthogonal to the perimeter. The tab 261 may include a first tab portion 265*a* extending from the sheet 264 at the first edge 263*a* and/or a second tab portion 265*b* extending from the sheet 264 at the second edge 263*b*. The first tab portion may be parallel and adjacent to the second tab portion. The tab 261 may be engaged by the member 282 of a position assurance device, such as contact carrier position assurance 280.

Figure 9D:
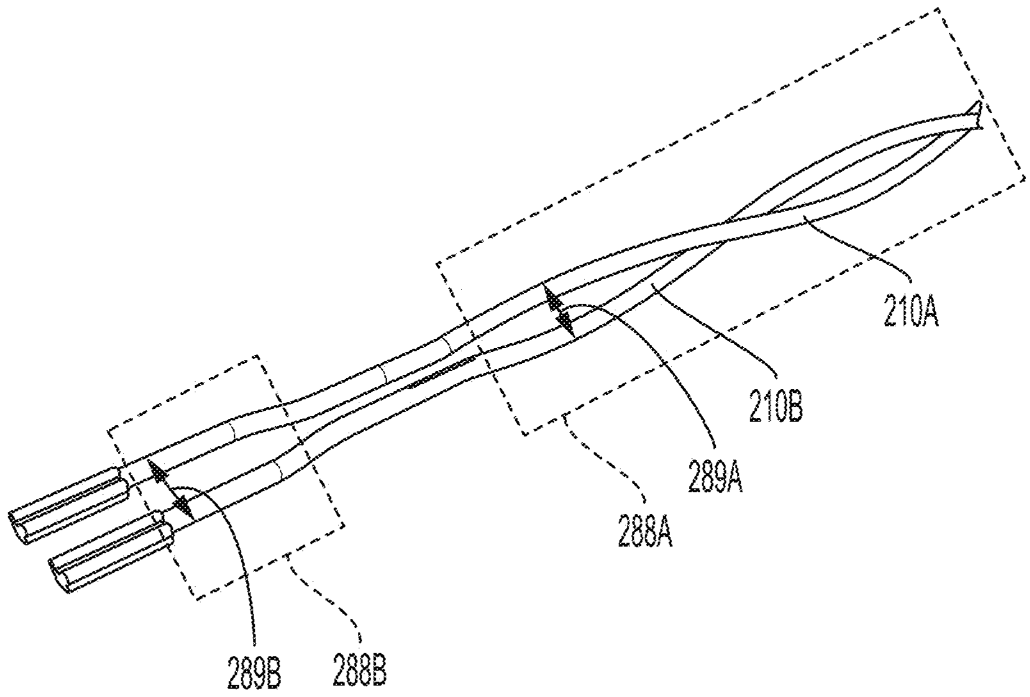
FIG. 9D is a perspective view of illustrative electrical conductors of the cable connector of FIG. 9A, in accordance with some embodiments.

FIG. 9D is a perspective view of illustrative electrical conductors of the cable connector of FIG. 9A, in accordance with some embodiments. As described herein, the electrical conductors may be insulated within the bulk of cable 213 and over a portion of their length within connector 200. The conductors 210A and 210B may be separated at a same distance throughout the length of the cable. That distance, for example, may be established by a uniform thickness insulative covering and then twisting the insulated conductors to hold them together. According to some embodiments, the conductors 210A and 210B insulated with insulation 217A and 217B may be provided at a first distance from each other at a first area, and a second distance at a second area. For example, portion 288A of FIG. 9D may represent a portion of the cable disposed within a cavity of a shield, such as the cavity 269 of the back shield 260. In some examples, the portion 288B may include a portion of the cable where the cable shield has been removed. Portion 288B may represent a portion of the cable forward of the portion of the ferrule 220 over which the cable shield is folded back.

In portion 288A, the first and second insulated conductors 210A and 210B may be separated with a first center-to-center spacing 289A, while in portion 288B, the first and second insulated conductors 210A and 210B may be separated with a second center-to-center spacing 289B. According to some examples, the spacing 289B may be larger than the spacing 289A.

In the example of FIG. 9D, the portion of the cable, 288B, may pass through an opening of a metal member, such as an impedance adaptor (e.g., impedance adaptor 230). In some examples, the metal member may be configured to match the impedance of the portion 288A of the cable to the portion 288B of the cable.

Figure 9E:
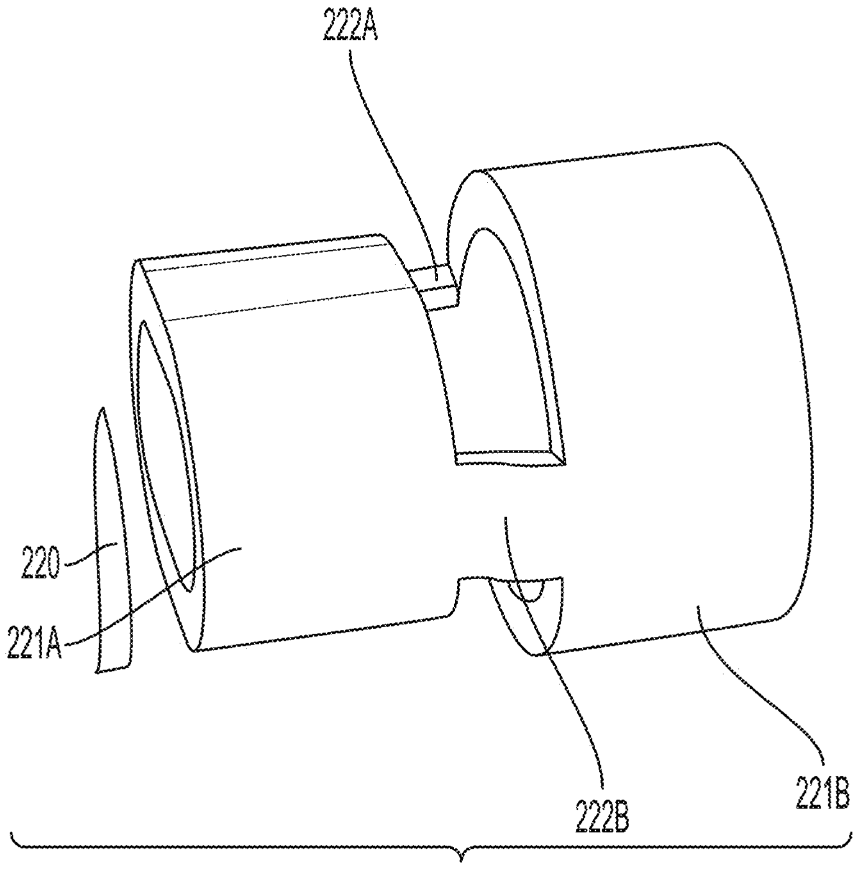
FIG. 9E is a perspective view of an illustrative ferrule of the cable connector of FIG. 9A, in accordance with some embodiments.

FIG. 9E is a perspective view of an illustrative ferrule 220 of the cable connector 200 of FIG. 9A, in accordance with some embodiments. The cable connector may include a ferrule, such as ferrule 220, which may include one or more annular portions. According to some embodiments, the ferrule 220 may be metal. In some examples, the ferrule may comprise a metal sheet formed into a tube.

In the example of FIG. 9E, ferrule 220 comprises a first and second annular portion, 221A and 221B. The first and second annular portions may be connected, for example, using one or more arms. Two annular portions provide reliable electrical connection among ground conductors of the terminated cable and also provides mechanical support, which together reduce noise in the cable assembly, even in an environment with substantial vibration.

Ferrule 220 includes arms 222A and 222B connecting the annular portions 221A and 221B. In this example, the annular portions 221A and 221B, though of different diameters, are concentric. According to some examples, the cable passes through the first and second annular portions 221A and 221B. In the configuration illustrated in FIG. 6, the second annular portion 221B is provided between the first annular portion and a metal member, such as impedance adaptor 230.

According to some embodiments, the portion of the cable 213 passing through ferrule 220 has its jacket removed, exposing the cable shield. The first annular portion 221A fits over the exposed shield and contacts the cable shield, such that they are electrically connected. In some embodiments, the cable shield may be pulled through the openings between annular portions 221A and 221B and folded back over annular portions 221B.

In some embodiments, the connector shield is crimped around annular portion 221B. Annular portion 221A may provide mechanical support and shielding for the portion of the cable with the cable shield removed.

Figure 10A:
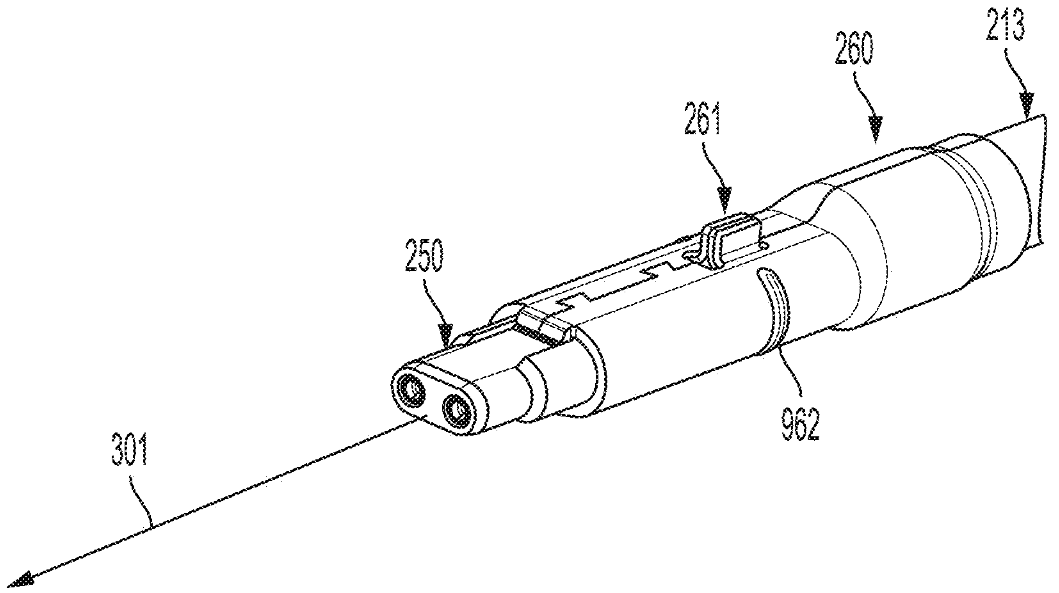
FIG. 10A is a top perspective view of the back shield of FIG. 9A attached to a cable and including an illustrative embossment, in accordance with some embodiments.
Figure 10B:
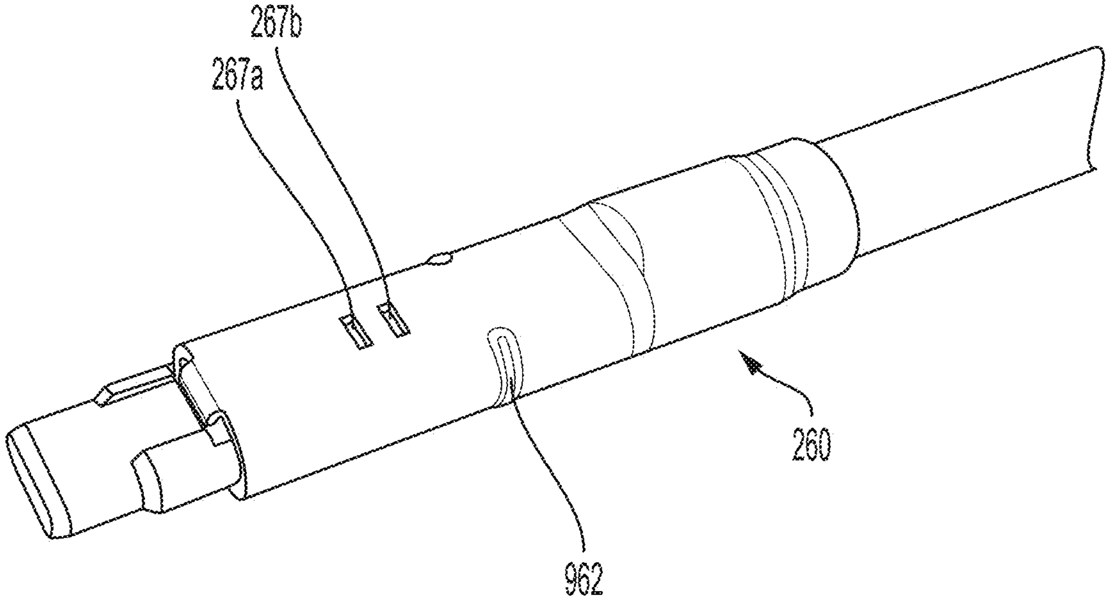
FIG. 10B is bottom perspective view of the back shield of FIG. 9A, in accordance with some embodiments.

As described above, a terminated cable subassembly may be shielded by a back shield 260 attached to a cable shield and a front shield 270 electrically and mechanically coupled to the back shield. In some embodiments, a simple, yet robust mechanism may be provided to electrically and mechanically connect the front shield and the back shield. That mechanism may include an embossment on one of the shields and/or one or more beams of one shield that fit within a slot of the other shield. FIG. 10A is a top perspective view of an illustrative embossment 962 of the illustrative back shield of FIG. 9A, in accordance with some embodiments. An embossment 962 may be provided on an outer surface of the back shield 260. For example, the embossment may protrude outward in a direction away from a cavity formed by joining the two edges of the sheet of back shield 260. As can be seen in FIGS. 10A and 10B, the embossment may be shaped as a ridge, extend around a substantial portion, such as more than 40% or more than 50% or more than 60%, of the perimeter of back shield 260.

FIG. 10B is bottom perspective view of the illustrative back shield 260 of FIG. 9A, in accordance with some embodiments. According to some examples, the back shield may include one or more features for receiving securing members from the front shield. In this example, those features are shaped as slots. In some examples, one or more slots may be disposed in the first linear segment 304*a* of the back shield 260.

In the example of FIG. 10B, the back shield 260 includes two slots 267*a* and 267*b*. The slots can be used to secure the front shield (e.g., illustrative front shield 270) to the back shield. For example, a distal portion (e.g., a distal end) of a beam of the front shield may be inserted into a slot of the back shield 260 such that the front shield 270 is mechanically connected to the back shield. In some embodiments, the mechanical attachment of the front shield 270 to the back shield 260 consists essentially of engagement of one or more beams of the front shield 270 and the one or more slots of the back shield 260 and friction between the embossment 962 and the front shield 270.

Figure 10C:
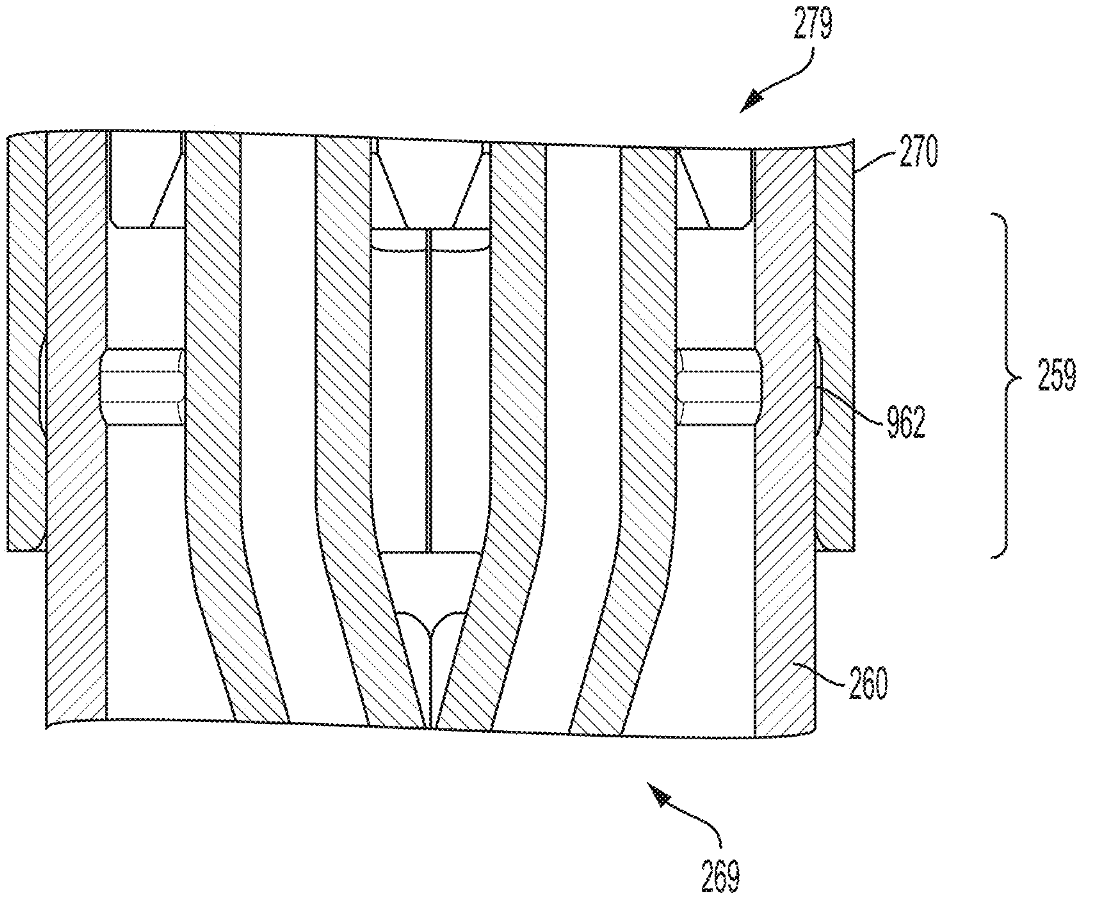
FIG. 10C is a cross sectional view of a portion, including the embossment, of the cable connector of FIG. 10A, in accordance with some embodiments.

FIG. 10C is a cross sectional view of a portion of the cable connector in FIG. 10A including embossment 962. As described herein, the front shield 270 comprises a sheet 274 encircling a first portion of a cavity 279, and the second sheet encircles a second portion 269 of the cavity. The front shield and the back shield overlap in a region of overlap 259. The embossment 962 is formed in this region of overlap 259. The embossment 962 is configured to provide contact, friction and/or electrical connectivity with the front shield 270 such that the embossment electrically connects the front shield 270 and back shield 260. According to some embodiments, the embossment comprises a ridge extending around at least 40% of the perimeter of the back shield 260.

Other features of the shields may be formed in the region of overlap such opening in one of the front and back shields resulting from formation of the feature are at least partially blocked by the other shield. Slots 267*a* and 267*b*, for example, may be formed in the region of overlap. Likewise, beams 272*a* and 272*b* (FIG. 11I) may be formed in the region of overlap.

Figure 10D:
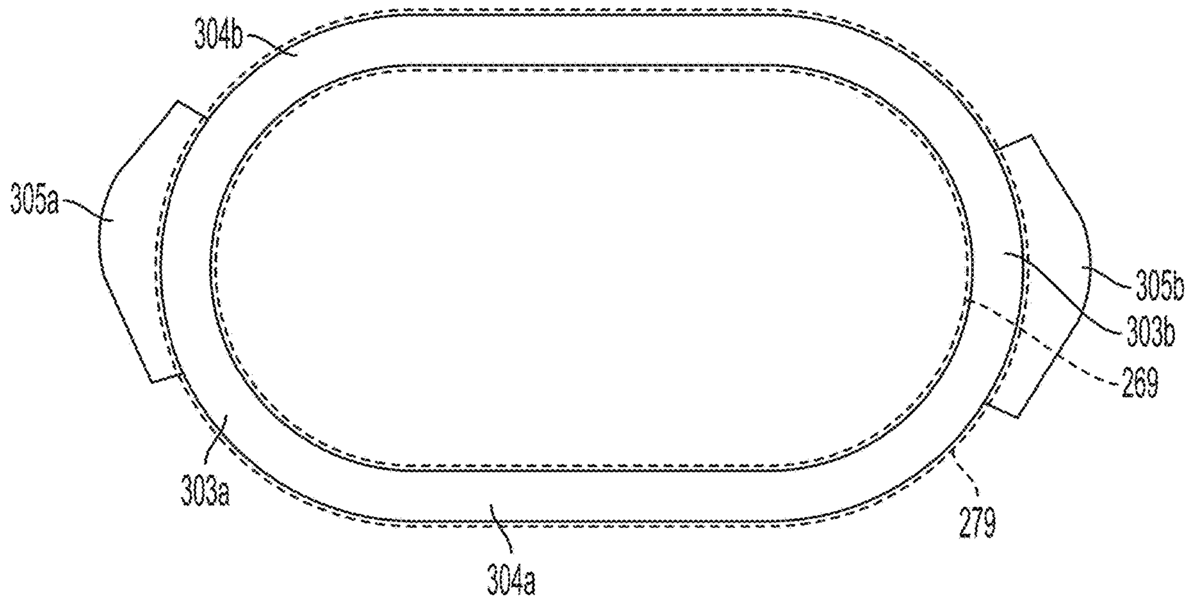
FIG. 10D is another cross sectional view of the cable connector of FIG. 10A, in accordance with some embodiments.

FIG. 10D is another cross sectional view of the cable connector in FIG. 10A, in accordance with some embodiments. The back shield 260 may have an oval cross section in the region of overlap 259. The oval cross section may include a first and second curved segment 304*a* and 304*b*, respectively, joined by first and second linear segments, 303*a* and 303*b* respectively. The embossment 962 may include first and second ridges 305*a* and 305*b*, respectively, such that the first and second ridges 305*a* and 305*b* extend from the first and second curved segments 304*a* and 304*b*.

Figure 11A:
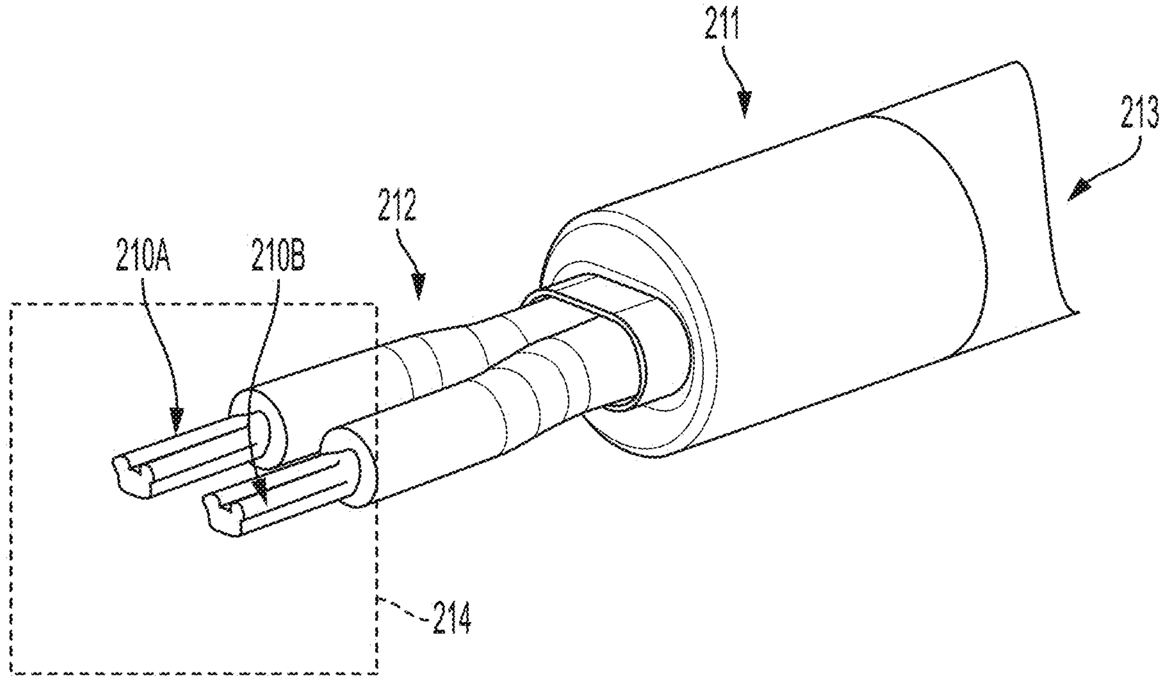
FIG. 11A is a perspective view of a stripped cable, in accordance with some embodiments.

FIGS. 11A-K illustrate a method of assembling a cable connector. For example, cable connector 200 may be assembled using the methods provided herein. FIG. 11A is a perspective view of the stripped cable 213, in accordance with some embodiments. The cable 213 may include a grounded portion 211. The cable may include a plurality of conductors 210A and 210B each insulated with insulator 212. The insulator 212 may be stripped in area 214 to expose portions of conductors 210A and 210B.

Figure 11B:
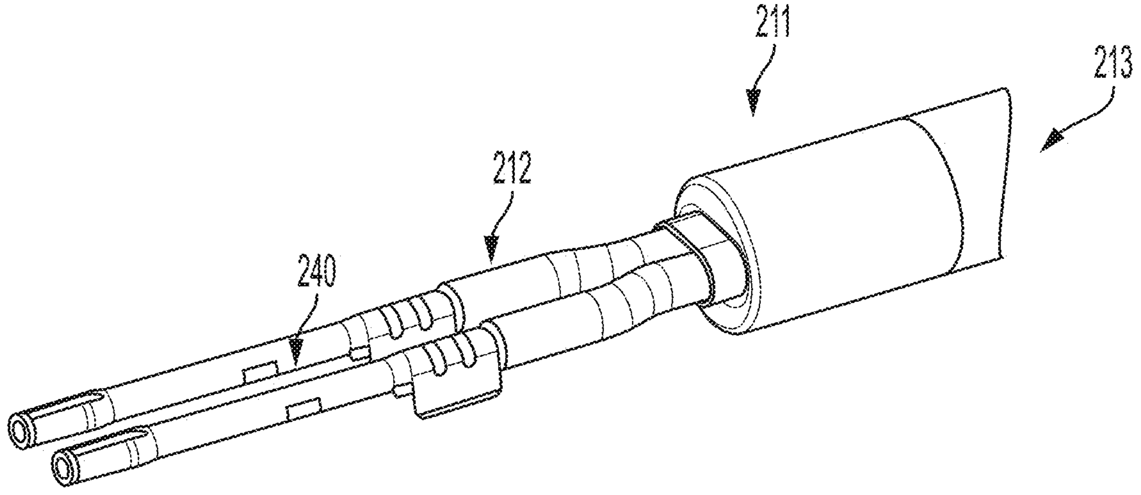
FIG. 11B is a perspective view of the cable of FIG. 11A with terminals crimped to the cable conductors, in accordance with some embodiments.

FIG. 11B is a perspective view of terminals 240 of the cable connector 200, following a crimping operation, in accordance with some embodiments. The exposed conductors 210A and 210B may be inserted into terminals 240, and crimped to secure the conductors in the terminals 240.

Figure 11C:
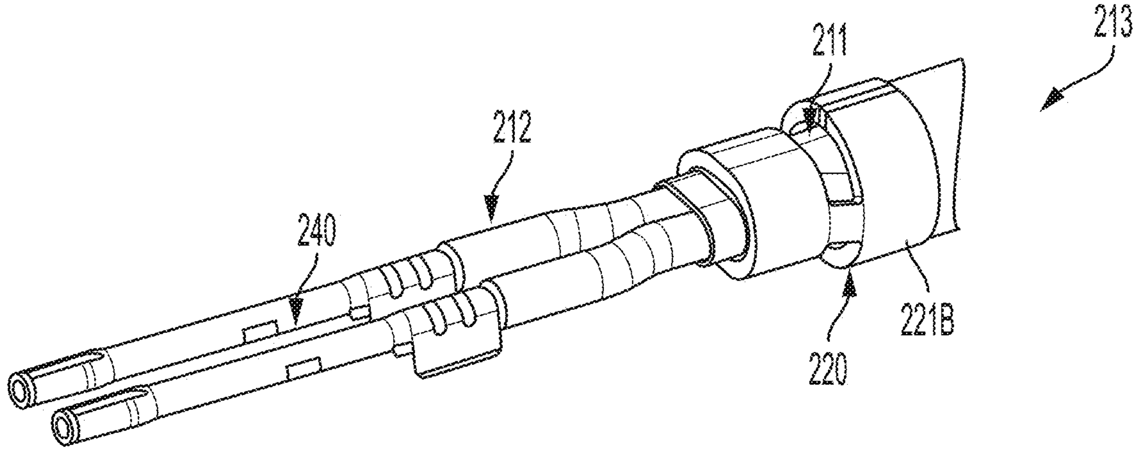
FIG. 11C is a perspective view of the cable of FIG. 11B with a ferrule assembled to the cable, in accordance with some embodiments.
Figure 11D:
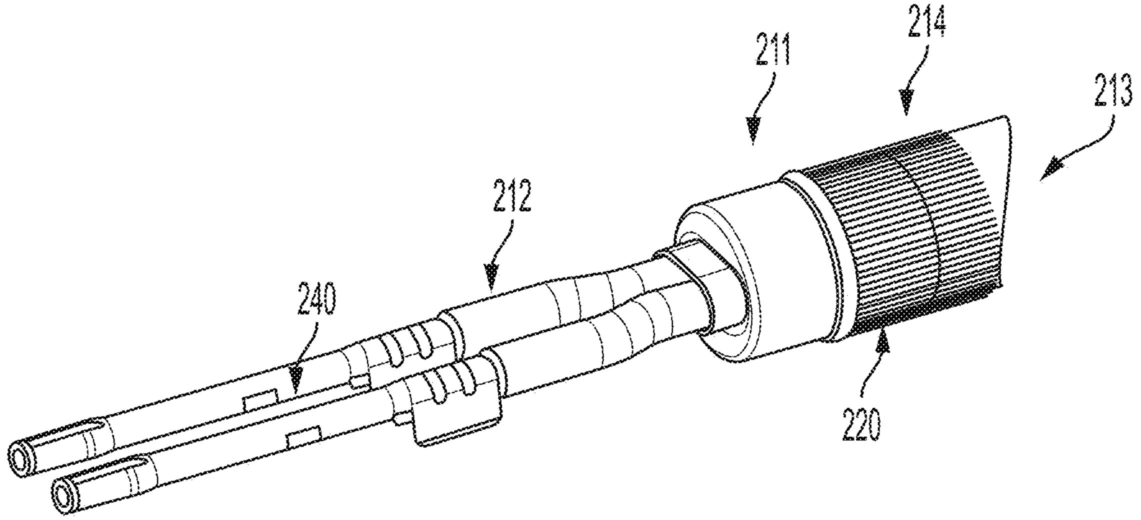
FIG. 11D is a perspective view of the cable of FIG. 11C with a braid of the cable bent over the ferrule, in accordance with some embodiments.

FIG. 11C is a perspective view of an assembled ferrule 220 of the cable connector 200, in accordance with some embodiments. The ferrule 220 may be slid onto the cable until the shielded portion 211 of the cable is disposed within second annular portion 221B of the ferrule. (The ground braid, providing shielding for cable 213, is not shown in FIG. 11C for simplicity.) The ground braid of the cable can then be pulled through openings in the ferrule between first and second annular portion 221A and 221B and then folded back over second annular portion 221B. For example, FIG. 11D is a perspective view of a braid 214 of the ground connection 211 following an operation for folding the braid, in accordance with some embodiments.

Figure 11E:
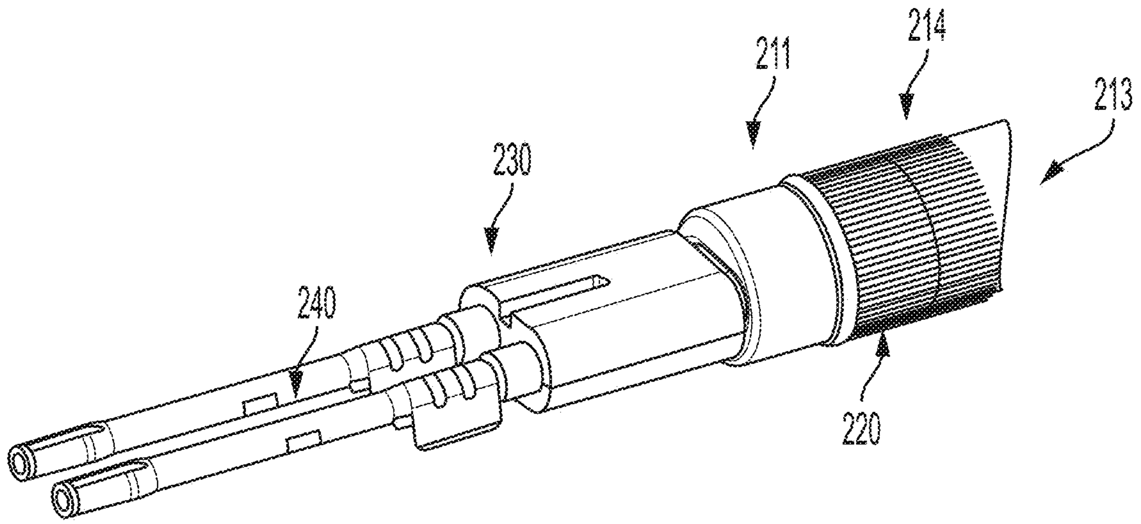
FIG. 11E is a perspective view of the cable of FIG. 11D with an impedance adaptor assembled on the cable, in accordance with some embodiments.

FIG. 11E is a perspective view of an impedance adaptor 230 assembled on the cable, in accordance with some embodiments. The impedance adaptor 230 is in the untwisted area 231 of the cable termination. The impendence adaptor 230 may cover portions of the conductors 210A and 210B with insulator 212, which precludes the impendence adaptor 230 from shorting the conductors 210A and 210B. The impedance adaptor 230 may comprise metal and is configured to provide metal in proximity to the cable conductors carrying signals. In some embodiments, the impedance adaptor will also be in contact with the back shield which will connect the impedance adaptor also to ground.

As illustrated below in FIGS. 12A and 12B, impedance adapter 230 may be annular and may be slid over the terminals 240 and the insulated portions of conductors 210A and 210B. Impedance adapter 230 may be held by the back shield or in any other suitable way.

Figure 11F:
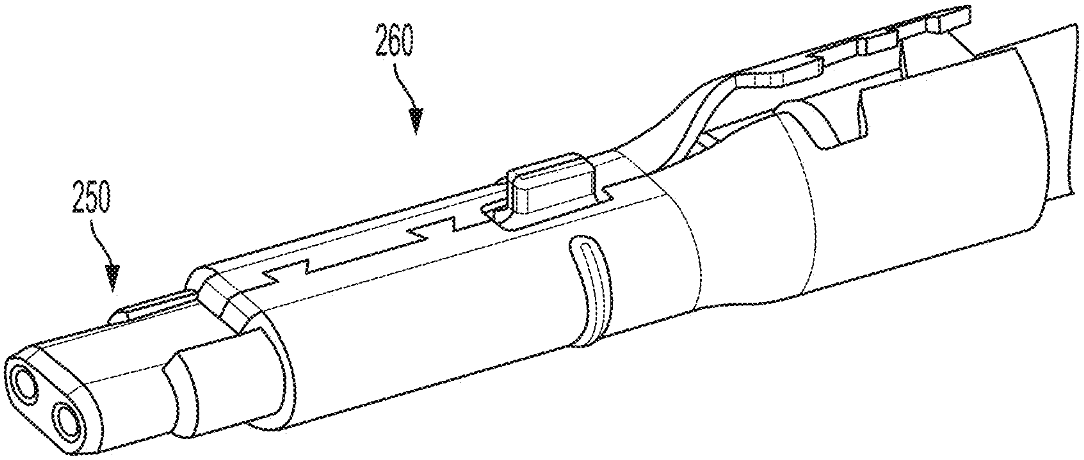
FIG. 11F is a perspective view of the cable of FIG. 11E with a contact carrier housing and a back shield in a state in which the back shield is partially attached to the cable, in accordance with some embodiments.

Terminals 240 may then be inserted into a contact carrier housing 250 and then the back shield may be attached. FIG. 11F is a perspective view of contact carrier housing 250 attached and the back shield in the process of being secured, in accordance with some embodiments. As described herein, the two edges of the sheet forming back shield 260 may be joined to form a cavity encircled by the sheet. Joining may be achieved by crimping tab portions into a tab and/or interlocking projections and recesses.

Figure 11G:
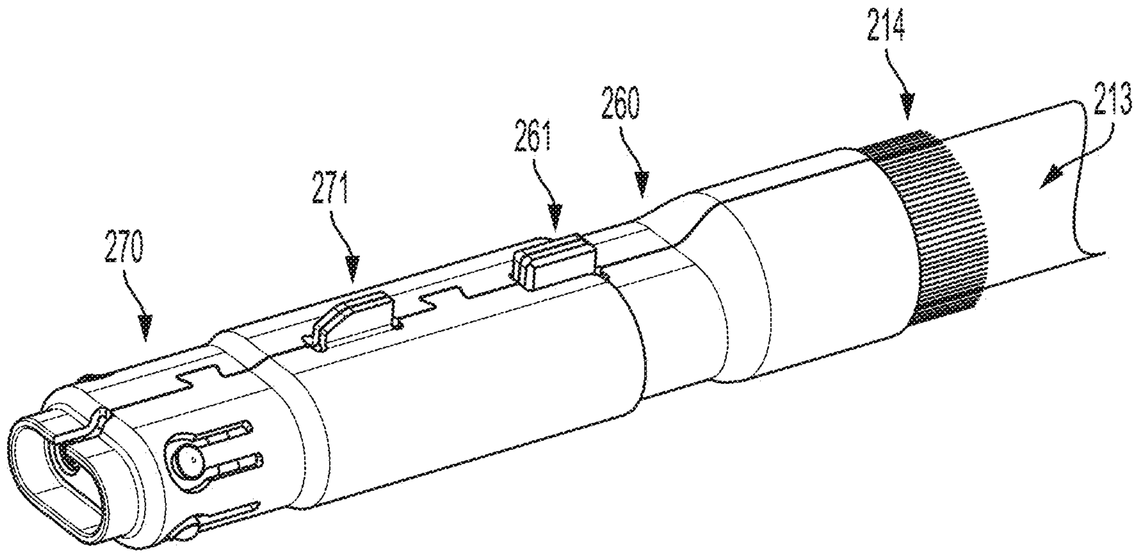
FIG. 11G is a top perspective view of the cable of FIG. 11F with a portion of a front shield slid over a portion of the back shield, in accordance with some embodiments.

With the back shield attached, the front shield may then be attached. The front shield may be formed into a tube and then slid onto the forward portion of the back shield. As described herein, the two edges of the sheet of front shield 270 may be joined to form a cavity encircled by the sheet. For example, part of the back shield 260 may be disposed within the cavity. FIG. 11G is a top perspective view of the front shield of the cable slid onto the back shield, in accordance with some embodiments.

Figure 11H:
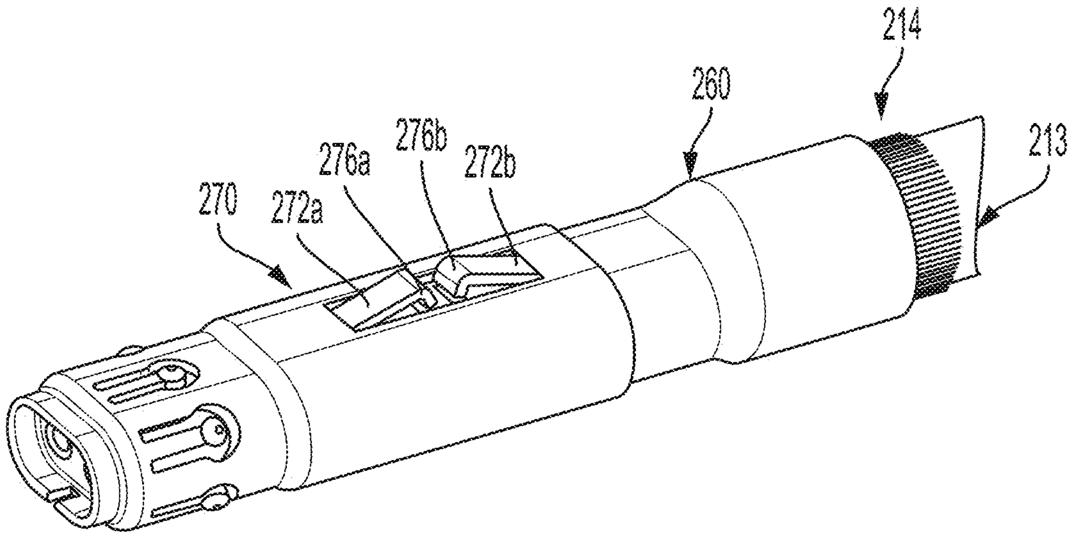
FIG. 11H is a bottom perspective view of the cable of FIG. 11G before the front shield is latched to the back shield, in accordance with some embodiments.

The front shield may be electrically and mechanically coupled to the back shield as a result of friction between the outer surface of embossment 962 and the inner surface of the front shield. Alternatively or additionally, the connection may be made through other engaging features. FIG. 11H is a bottom perspective view of the front shield of FIG. 11G of the cable, in accordance with some embodiments. The front shield 270 may further include a beam 272*a* and a beam 272*b* cut in the sheet 274. In some examples, each of the beams 272*a* and 272*b* has a distal portion 276*a* and 276*b* respectively. The distal portions 276*a* and 276*b* are configured to extend through respective slots (e.g., slots 215*a* and 215*b*) of the back shield 260 such that the first shield is mechanically connected to the second shield. The beam 272*a* may comprise a first segment 277*aa* parallel to the first sheet 274 and a distal portion comprising second segment 277*ab* that is transverse to the first segment. The beam 272*b* may comprise a first segment 277*ba* parallel to the first sheet 274 and a distal portion comprising a second segment 277*bb* that is transverse to the first segment. In some examples, two or more beams and corresponding slots may be provided.

In the state shown in FIG. 11H, beams 272*a* and 272*b* are deflected outwards from the perimeter of front shield 270. In this configuration, distal portions 276*a* and 276*b* are removed from the cavity inside front shield 270 such that fronts shield 270 may be slid over back shield 260. Once front shield 270 is positioned with respect to back shield 260, beams 272*a* and 272*b* may be returned to an undeflected state such that distal portions 276*a* and 276*b* engage features of back shield 260, latching the front shield and the back shield together.

Figure 11I:
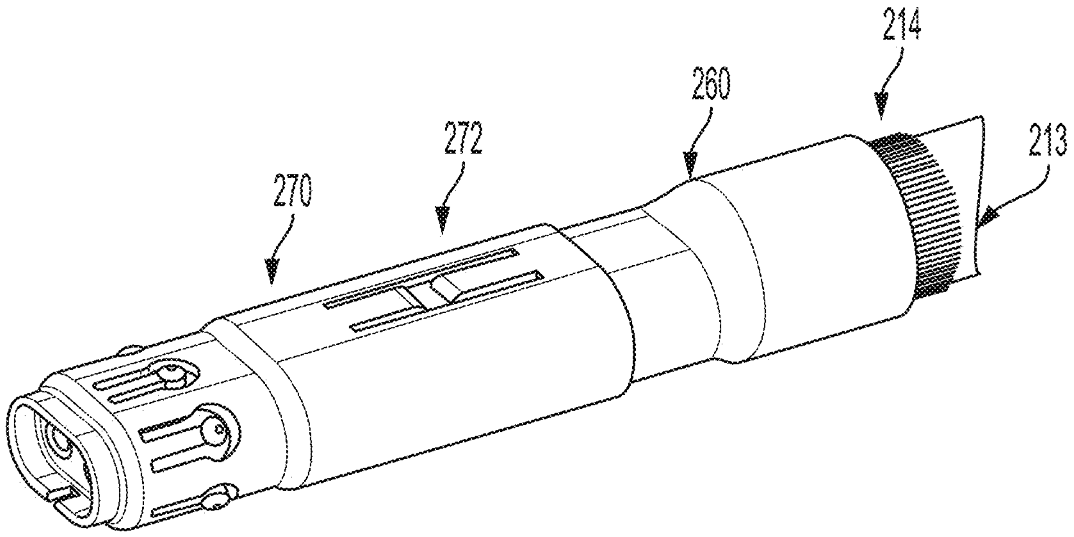
FIG. 11I is a perspective view of the cable of FIG. 11H with the front shield latched into the back shield, in accordance with some embodiments.

FIG. 11I is a perspective view of the terminated cable subassembly with the front shield latched into the back shield, in accordance with some embodiments.

Figure 11J:
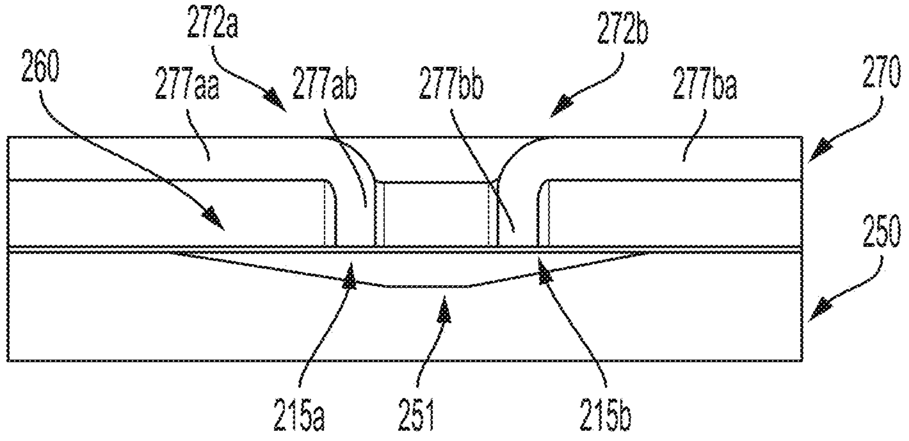
FIG. 11J is a cross sectional view of a portion of the cable of FIG. 1I illustrating the front shield latched into the back shield in additional detail, in accordance with some embodiments.

FIG. 11J is a cross sectional view of the front shield latched into the back shield in additional detail, in accordance with some embodiments. In some embodiments, a recess 251 may be provided in the contact carrier housing 250 to ensure that first segment 277*ba* and first segment 277*bb* do not hit contact carrier housing 250, and enabling segments 277*aa* and 277*ba* to return to a state flush with the perimeter of front housing 270.

Figure 12A:
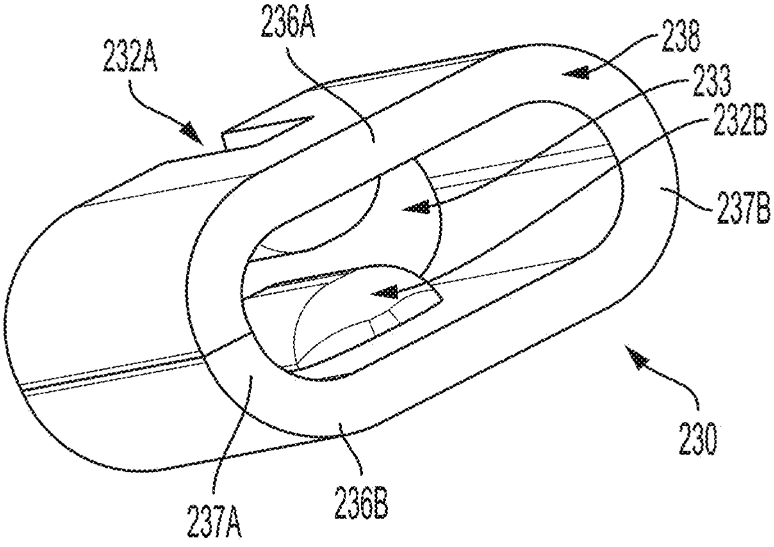
FIG. 12A is a rear perspective view of the impedance adaptor, in accordance with some embodiments.
Figure 12B:
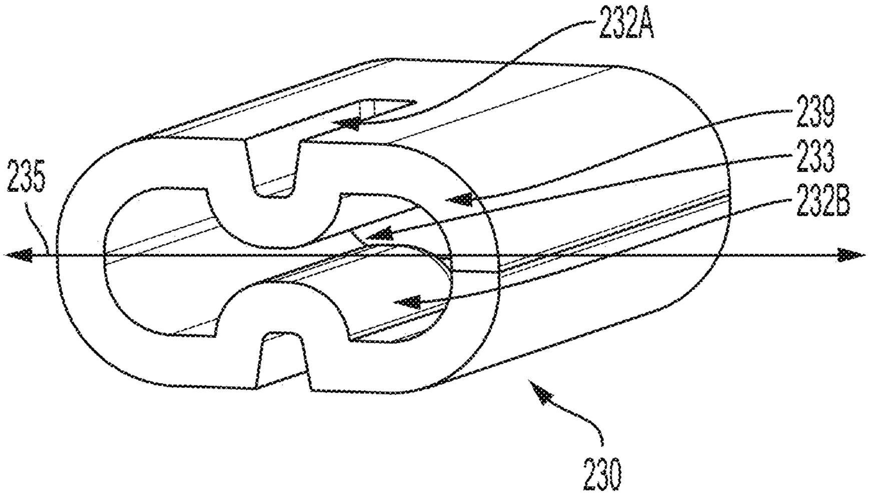
FIG. 12B is a front perspective view of the impedance adaptor, in accordance with some embodiments.

FIG. 12A is a rear perspective view of an exemplary impedance adaptor, such as the impedance adaptor 230, in accordance with some embodiments. FIG. 12B is a front perspective view of the exemplary impedance adaptor. As described herein, impedance adaptor 230 may be disposed around the cable 213 and may be adjacent to the ferrule such that an opening of the ferrule aligns with the opening 233 of the impedance adaptor. According to some embodiments, the impedance adaptor may be metal, for example, the impedance adaptor may comprise a metal sheet formed into a tube. The metal sheet may be of the same, or substantially the same, thickness and/or material as the metal sheet that forms the ferrule. Such a configuration may simplify manufacture as the ferrule and impedance adapter may be formed from the same sheet of metal. The impedance adaptor 230 may be installed in the untwisted area 231 of the cable termination.

In some embodiments, the impedance adaptor 230 may have a generally oval cross section. For example, the impedance adaptor 230 across a first end 238 may have an oval cross section comprising a first and second curved segment such as 237A and 237B, respectively, joined by first and second linear segments 236A and 236B, respectively. This shape enables the impedance adapter to fit over two insulated conductors of cable 213 positioned side-by-side in an untwisted state.

The impedance adaptor 230 may have an oval cross section across a second end 239. The oval may have a major axis 235. The impedance adaptor may have one or more embossments such as embossment 232A and embossment 232B. The embossments may extend towards the major axis (e.g., in the direction of the cavity formed by the perimeter of the metal). The embossments 232A and 232B may be between the first and second insulated electrical conductors 212.

In this example, the embossments 232A and 232B extend along only a portion of the length of the impedance adapter, such as between 25 and 75% of the length, or 40 to 60% in some embodiments. In this configuration, the embossments align with portions of the conductors of the cable that are more widely separated. The regions of the impedance adapted without embossments align with portions of the conductors of the cable that are less widely spaced. Impedance adapter 230 tends to match the impedance of the unshielded portion of the cable relative to the shielded portion as well as along the length of the unshielded portion of the cable.

In the illustrated example, the embossment is generally uniform along a portion of the length of impedance adapter 230. This configuration has been found to provide adequate impedance matching along the length of the unshielded portion of the cable. In other embodiments, however, the embossment may vary in volume, becoming taller and/or wider in relation to the separation between the conductors of the cable. Alternatively or additionally, the embossment may extend along the entire length of impedance adaptor 230 or may be omitted.

Figure 13:
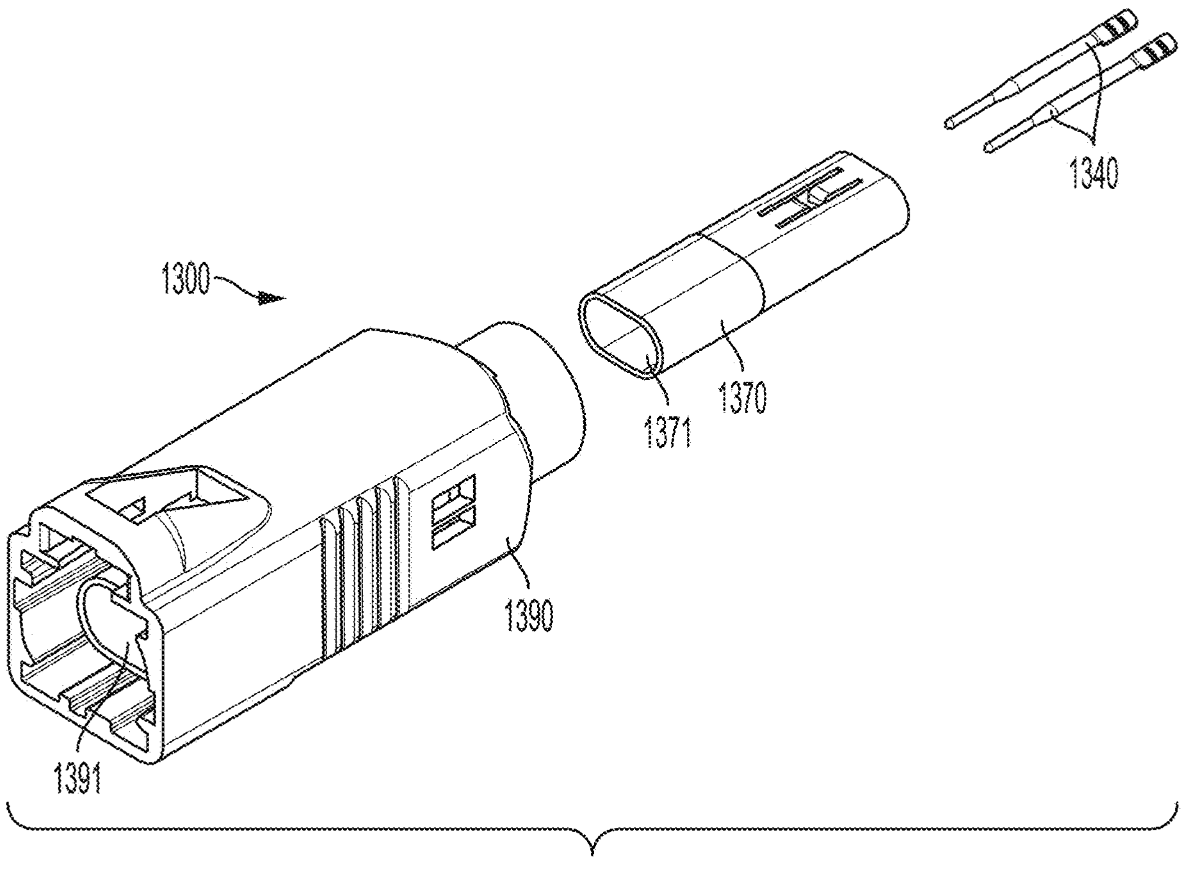
FIG. 13 is a perspective view of an illustrative cable connector components to configure a cable connector to mate with the cable connector of FIG. 5, in accordance with some embodiments.

Cable connector 200 is shown as a receptacle connector configured to mate with a board connector 100 configured as a pin header. The construction techniques described herein may be applied to a cable connector with mating contact portions configured with pins by substituting a small number of components for those shown in FIG. 6. FIG. 13 is perspective view of illustrative components that can be substituted for components shown in FIG. 6 to form a cable connector 1300 configured to mate with the cable connector 200 of FIG. 5, in accordance with some embodiments. The cable connector 1300 may be formed with housing 1390 in place of housing 290, front shield 1370 in place of front shield 270, and terminals 1340 in place of terminals 240. In some embodiments, other components may alternatively or additionally be substituted. For example, a contact carrier housing, configured to hold terminals 1340, may be used in place of a contact carrier housing 250.

The front shield 1370 may be disposed in the housing 1390 and may have an opening 1371 configured to mate with the mating end 520 of the connector 200. The housing 1390 may also include an opening 1391 configured to mate with the mating end 520 of the connector 200. The terminals 1340 may be disposed in the front shield 1370. In this example, the terminals have mating contact portions shaped as pins to facilitate mating with a cable connector with terminals configured as receptacles. The mating interfaces and latching features of cable connector 1300 will likewise be complementary to those of connector 200. The other components, such as the back shield, the ferrule and the impedance adapter, may otherwise be the same or substantially the same as those used in connector 200.

Techniques described herein may be used in connectors having configurations other than those described above. For example, techniques described herein may be used in mezzanine connectors or in backplane connectors. Such alternative connector configurations may be used with all of the features described herein or a subset of any suitable number of features. Moreover, it should be appreciated that all of the structures, materials and construction techniques described herein may be used together, but, in some embodiments, some or all of the structures, materials or techniques may be omitted.

Further engaging features are described to electrically and/or mechanically engage two components. For purposes of illustration, exemplary embodiments are described in which the engaging features are on one part or the other. The positioning of the engaging features may be reversed.

As another example, a cable connector was illustrated with a tab 261 on the back shield and a tab 271 on the front shield. Each tab may be configured to form a latching feature, which may engage with a complementary latching feature (such as a beam) of a connector housing and or may be engaged by a portion of a CCPA. As described herein, the front shield may have an axis of elongation and may be concentric with and electrically connected to the back shield and the tab of the front shield is illustrated extending in the same direction as the tab of the back shield. However, the tabs on the front and back shield need not be aligned or extend in the same direction. With different configurations of front and back tabs, a housing receiving a terminated cable assembly with a front shield secured to a back shield would have multiple slots to receive those tabs. By providing multiple possible positions of tab on the front and back shields, multiple terminated cable assembly configurations are possible, each of which will only fit within a housing with a particular configuration of slots that receive the tabs. In this way, multiple keying configurations may be created. In some embodiments, the tab of the back shield may be on an opposite side of the terminated cable subassembly relative to the tab of the front shield and/or may extend away from the cavity in a direction opposite from a direction of the tab of the front shield.

As another example, a board connector with contact portions and tails oriented at right angles. In alternative embodiments, contact portions and tails may extend in the same direction. The contact portions and tails alternatively may extend from the channels of the insulative member of a terminal subassembly in opposite directions along a same axis.

Such alterations, modifications, and improvements are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

All definitions, as defined and used herein, should be understood to control over dictionary definitions, definitions in documents incorporated by reference, and/or ordinary meanings of the defined terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electrical connector, comprising:

at least one electrical conductor;

a shield comprising a sheet with a first edge and a second edge, wherein:

the first edge is joined to the second edge to at least partially encircle a cavity with a perimeter bounded by the sheet, at least a part of the at least one electrical conductor is disposed within the cavity, and the sheet comprises a tab extending away from the cavity in a direction orthogonal to the perimeter;

an insulative housing comprising an opening, wherein the shield is inserted into the opening; and a position assurance device comprising a member extending into the opening and engaging the tab.

2. The electrical connector of claim 1, wherein:

the tab comprises a latching feature.

3. The electrical connector of claim 1, wherein:

the first edge is joined to the second edge via interlocking projections and openings at the first edge and the second edge.

4. The electrical connector of claim 1, wherein:

the tab extends from the first edge of the sheet.

5. The electrical connector of claim 1, wherein:

the tab comprises a first tab portion extending from the sheet and a second tab portion extending from the sheet; and the first tab portion is parallel to and adjacent to the second tab portion.

6. The electrical connector of claim 5, wherein:

the first tab portion extends from the sheet at the first edge; and the second tab portion extends from the sheet at the second edge.

7. The electrical connector of claim 1, wherein:

the shield comprises a first shield;

the tab comprises a first tab;

the electrical connector comprises a second shield at least partially encircling the cavity;

the second shield comprises a second tab extending away from the cavity in a direction orthogonal to the perimeter;

the electrical connector comprises a mating end;

the cavity is open at the mating end of the connector;

the second tab has a first edge facing the mating end and a second edge opposite the first edge;

a first edge of the second tab is tapered towards the mating end of the connector; and a second edge of the second tab is orthogonal to the perimeter.

8. The electrical connector of claim 7, wherein:

the insulative housing comprises a beam comprising a cantilevered end and a latch at the cantilevered end extending into the opening; and the beam is configured such that the latch is aligned with the second edge of the second tab when the shield is fully inserted into the opening.

9. The electrical connector of claim 8, wherein:

the latch comprises a camming surface; and the beam is configured such that the first edge of the second tab is aligned with the camming surface of the latch when the shield is partially inserted into the opening.

10. The electrical connector of claim 9, wherein:

the at least one electrical conductor comprises a pair of signal terminals.

11. The electrical connector of claim 7, wherein:

the first shield has an axis of elongation;

the first shield is concentric with and electrically connected to the second shield; and the first tab is aligned with the second tab in a direction of the axis of elongation.

12. An electrical connector with a mating end and a cable termination end, opposite the mating end, the electrical connector comprising:

at least one electrical conductor;

a first shield comprising a first sheet, wherein the first sheet encircles a first portion of a cavity; and a second shield comprising a second sheet, wherein the second sheet encircles a second portion of the cavity, the second portion of the cavity overlapping the first portion of the cavity in a region of overlap, wherein:

at least a part of the at least one electrical conductor is disposed within the cavity; and in the region of overlap, the second shield is inside the first shield and the second shield comprises an embossment extending outwardly from a surface of the second shield and away from the cavity.

13. The electrical connector of claim 12, wherein:

the embossment electrically connects the first shield and the second shield.

14. The electrical connector of claim 13, wherein:

the second shield comprises an axis of elongation and a perimeter; and the embossment comprises a ridge extending around at least 40% of the perimeter.

15. The electrical connector of claim 13, wherein:

the second shield has an oval cross section in the region of overlap comprising first and second curved segments joined by first and second linear segments; and the embossment comprises first and second ridges extending from the first and second curved segments, respectively.

16. The electrical connector of claim 15, wherein:

the first shield comprises a beam;

the second shield comprises a slot, and a distal portion of the beam extends through the slot such that the first shield is mechanically connected to the second shield.

17. The electrical connector of claim 16, wherein:

the beam is cut in the first sheet; and the slot of the second shield is disposed in the first linear segment of the second shield.

18. The electrical connector of claim 17, wherein:

the beam comprises a first segment parallel to the first sheet and a second segment transverse to the first segment, the second segment extends through the slot.

19. The electrical connector of claim 18, wherein:

the beam is a first beam;

the first shield comprises a second beam;

the slot is a first slot;

the second shield comprises a slot, parallel to the first slot; and a distal end of the second beam extends through the second slot.

20. The electrical connector of claim 19, terminated to a cable comprising a cable shield, wherein:

an end of the cable with the cable shield exposed is inserted in the cavity;

the second shield encircles the cable inserted in the cavity and electrically connects to the exposed cable shield;

the first shield comprises contact beams configured for mating with a ground structure of a complementary connector; and the contact beams of the first shield are electrically coupled through the first shield, the embossment and the second shield to the cable shield.

21. The electrical connector of claim 12, wherein:

the first shield comprises at least one beam;

the second shield comprises at least one slot, a distal portion of each beam of the at least one beam extends through a respective slot of the at least one slot; and the mechanical attachment of the first shield to the second shield consists essentially of engagement of the at least one beam and the at least one slot and friction between the embossment and the first shield.

22. A cable assembly comprising a cable terminated with an electrical connector, wherein:

the electrical connector comprises:

a connector shield at least partially encircling a first portion of a cavity; and the cable comprises:

a first portion outside the cavity comprising:

a first insulated electrical conductor;

a second insulated electrical conductor; and a cable shield at least partially surrounding the first and second insulated electrical conductors, with the first and second insulated conductors separated with a first center-to-center spacing;

a second portion disposed within the cavity, the second portion comprising the first insulated electrical conductor and the second insulated electrical conductor, with the first and second insulated conductors separated with a second center-to-center spacing; and a ferrule comprising a first annular portion, a second annular portion, and a plurality of arms joining the first annular portion to the second annular portion, wherein the cable passes through the first annular portion and the second annular portion.

23. The cable assembly of claim 22, wherein:

the cable shield is absent in the second portion.

24. The cable assembly of claim 23, wherein:

the connector shield is electrically connected to the cable shield.

25. The cable assembly of claim 22, further comprising:

a metal member within the cavity, the metal member comprising an opening therethrough, wherein the second portion of the cable passes through the opening of the metal member.

26. The cable assembly of claim 25, wherein:

the second center-to-center spacing is larger than the first center-to-center spacing; and the metal member is configured to match the impedance of the second portion of the cable to the first portion of the cable.

27. The cable assembly of claim 25, wherein:

the second annular portion is between the first annular portion and the metal member.

28. The cable assembly of claim 27, wherein:

the first annular portion contacts the cable shield;

the connector shield is crimped around the first annular portion; and the connector further comprises first and second contacts crimped to respective conductors of the first and second insulated conductors.

29. The cable assembly of claim 28, wherein:

the metal member is an impedance adaptor;

the ferrule comprises a first metal sheet formed into a tube;

the impedance adaptor comprises a second metal sheet formed into a tube; and the first metal sheet and the second metal sheet are of a same material and have a same thickness.

30. The cable assembly of claim 25, wherein:

the metal member comprises a first end and a second end with the opening extending between the first end and the second end;

the opening at the first end is shaped as an oval;

the opening, at the second end is shaped as an oval with a major axis and embossments extending towards the major axis; and the embossments are between the first and second insulated electrical conductors.

* * * * *